United States Patent
Audenaert et al.

(10) Patent No.: US 9,228,055 B2
(45) Date of Patent: Jan. 5, 2016

(54) POLYETHER HYBRID EPOXY CURATIVES

(75) Inventors: Frans A. Audenaert, Kaprijke (BE);
Martin A. Hutchinson, Bedale (GB);
Ian Robinson, Northallerton (GB)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/002,457

(22) PCT Filed: Feb. 3, 2012

(86) PCT No.: PCT/US2012/023763
§ 371 (c)(1),
(2), (4) Date: Aug. 30, 2013

(87) PCT Pub. No.: WO2012/121822
PCT Pub. Date: Sep. 13, 2012

(65) Prior Publication Data
US 2013/0333840 A1 Dec. 19, 2013

(30) Foreign Application Priority Data

Mar. 4, 2011 (EP) ..................................... 11157025

(51) Int. Cl.
| | | |
|---|---|---|
| C08G 69/26 | (2006.01) | |
| C08G 18/50 | (2006.01) | |
| C08G 59/54 | (2006.01) | |
| C08G 65/332 | (2006.01) | |
| C08G 65/333 | (2006.01) | |
| C08G 73/02 | (2006.01) | |
| C09D 163/00 | (2006.01) | |
| C09J 163/00 | (2006.01) | |

(52) U.S. Cl.
CPC ............ *C08G 69/26* (2013.01); *C08G 18/5024* (2013.01); *C08G 59/54* (2013.01); *C08G 65/3322* (2013.01); *C08G 65/33306* (2013.01); *C08G 73/028* (2013.01); *C09D 163/00* (2013.01); *C09J 163/00* (2013.01); *C08G 2650/50* (2013.01)

(58) Field of Classification Search
CPC ............ C08G 69/26; C08G 65/33306; C08G 65/3322; C08G 73/028; C08G 2650/50
USPC ......................................... 525/408, 420, 430
See application file for complete search history.

(56) References Cited

U.S. PATENT DOCUMENTS

| | | |
|---|---|---|
| 4,507,466 A | 3/1985 | Tomalia |
| 5,017,675 A | 5/1991 | Marten |
| 5,210,195 A | 5/1993 | Lin |
| 5,705,602 A | 1/1998 | Kawashima |
| 6,632,872 B1 | 10/2003 | Pellerite |
| 2008/0146381 A1 | 6/2008 | Kondos |

FOREIGN PATENT DOCUMENTS

| | | |
|---|---|---|
| EP | 301716 | 2/1989 |
| EP | 0999245 | 5/2000 |
| EP | 1433775 | 11/2008 |
| RU | 2214434 C2 | 10/2003 |
| WO | WO 93-21257 | 10/1993 |
| WO | WO 2006-124264 | 11/2006 |

OTHER PUBLICATIONS

Clemens, "Diketene", Chemical Reviews, 1986, vol. 86, No. 2, pp. 241-318.
Cui-Qin, "Systhesis of Dendritic Twelve Ester", Chinese Journal of Synthetic Chemistry, 2003, vol. 11, No. 5, pp. 424-426.
Hansen, "Surface Tension by Pendant Drop, A Fast Standard Instrument Using Computer Image Analysis", Journal of Colloid and Interface Science, Jan. 1991, vol. 141, No. 1, pp. 1-9.
Krevelen "Properties of Polymers: Their Correlation with Chemical Structure: Their Numerical Estimation and Prediction Form Additive Group Contributions", $3^{rd}$ edition, 200-225, (1990).
Witzeman, Transacetoacetylation with tert-Butyl Acetoacetate: Synthetic Applications J. Org. Chem., 1991, vol. 56, No. 5, pp. 1713-1718.
Wu, A Novel Poly(amido amine) with Methoxy Carbonyl Groups and High Charge Density: Synthesis and Nanoscopic Self-assembly with Polyanione. e-polymers 2007, No. 152, 14 pages. XP-002651202.
International Search Report for International PCT Application No. PCT/US2012/023763 Mailed on Jul. 27, 2012, 5 pages.
Russian Patent Application No. 2013138308 Notice of Allowance dated May 13, 2015, 10pgs.

*Primary Examiner* — Robert Jones, Jr.
(74) *Attorney, Agent, or Firm* — Gregg H. Rosenblatt

(57) ABSTRACT

This invention relates to a polyether-amido-amine compound, obtainable by a two-step reaction of a poly-etheramine with an alkyl acrylate and a polyalkyle-neimine, whereas the polyetheramine and the polyalkyleneimine have at least one primary or secondary amine group, in which the first step comprises the reaction of the polyetheramine with the alkyl acrylate and the second step comprises the reaction of the polyalkyleneimine with the product of the first step. The invention also relates to a method for synthesizing a polyether-amido-amine compound by a two-step-reaction. Another object of this invention is a curable composition containing at least one polyether-amido-amine-compound of this invention and a method for coating the surface of a substrate or for binding at least two substrates together using such a curable composition.

14 Claims, No Drawings

POLYETHER HYBRID EPOXY CURATIVES

This invention relates to a polyether-amido-amine compound, which is especially useful as a curing agent, in particular for epoxy or isocyanate systems. The invention also relates to a method for synthesising a polyether-amido-amine compound by a two-step-reaction. Another object of this invention is a curable composition containing at least one polyether-amido-amine-compound of this invention and a method for coating the surface of a substrate or for binding at least two substrates together using such a curable composition or for providing a cured resin, sealant or composite.

Currently, many oil and gas pipelines are either left unprotected or alternatively, a protective coating is applied to the pipe surface to provide protection of the pipeline during storage, construction and operation. Such a protective coating often comprises a thin film epoxy or a fusion-bonded epoxy. At the time when oil and gas pipelines were first being installed in large quantities, it was believed that internal protection of those pipes were not necessary because of the non-corrosive nature of gases and liquids involved. However, in the last thirty years, the practice of applying an internal lining to oil and gas pipelines has become more prevalent due to the benefits which are provided by a thin internal coating or lining.

For this purpose, a liquid, cold curing and solvent free coating composition is described in EP 0 999 245 A1. This coating composition comprises a liquid epoxide resin in conjunction with a liquid curing agent or hardener, for which a cycloaliphatic polyamine adduct or a blend of liquid polyamide and a cycloaliphatic polyamine adduct is proposed. It has been found however that the curing agents presented in this document do not fulfil the requirements in all aspects. For example, it has been found that the adhesion properties of the components described in the document are not satisfying on some substrates used in pipeline construction. Further, the flexibility of the cured compositions is also not satisfactory in any case.

In EP 0 379 107 A2, a primary and/or secondary amine groups carrying polyamidoamine is disclosed as a curing agent for epoxy group containing compositions. This curing agent is obtained by polycondensation of a composition from the groups of dicarbonacids with oxyalkylene groups or esters of these dicarbonacids with polyamines which contain at least two condensable amino groups. Although this type of curing agents may overcome some of the disadvantages of the above described cycloaliphatic polyamine curing agents, these polyamidoamine curing agents may not fulfil all demands for a curing agent for pipeline coating compositions. One aspect is that these compositions are quite difficult to synthesize, especially for the reaction of the diacid with the polyamine composition, high temperatures are typically needed which may lead to an undesired yellowing of the reaction product. On the other hand, if the diester is used as starting material, it is a problem that always both of the endgroups will react with the polyamine due to the high reactivity of the ester groups. Hence, this reaction always leads to higher molecular weight curing agents which are in many cases not liquid at room temperature. As it is a necessary property for pipeline coating compositions that the coating may be applied in a very thin and smooth layer and preferably using low temperature curing conditions, a low viscosity of the coating composition is desirable, which is usually more difficult to achieve if the curing agent is a solid.

Other curing agents are known in the art which are sold under the trade name Ancamide®. Although these curing agents show good characteristics in some aspects, they are quite expensive and the availability on the market is limited.

It is therefore an object of the present invention to provide a composition which can be used as a curing agent for epoxy systems, which can be more easily prepared and which is preferably in the liquid state at room temperature. Further, this composition should lead to a lower viscosity curable composition if it is mixed with a curable epoxy system.

This object is solved by a polyether-amido-amine compound, obtainable by a two-step reaction of a polyetheramine with an alkyl acrylate and a polyalkyleneimine, whereas the polyetheramine and the polyalkyleneimine have at least one primary or secondary amine group, in which the first step comprises the reaction of the polyetheramine with the alkyl acrylate and the second step comprises the reaction of the polyalkyleneimine with the product of the first step.

It has been found that the compositions according to the current invention allow the formulation of liquid, low-viscosity (at 25° C.) curable epoxy compositions which, as a consequence, allow the preparation of thin coatings to be used for example to coat pipes for gas- or oil-pipelines.

The low viscosity has the further advantage that a curable composition with such a curing agent may be applied by spraying to the surface of the pipe. This does not only allow the preparation of thin coatings, but the coatings are also very even in terms of thickness variations. Besides that, the surface roughness of the coatings are relatively small, which is especially useful as it has been found that a smooth coating on the inside of a gas- or oil-pipeline does in fact reduce the backpressure of the gas or the fluid to be transported through that pipeline keeping in mind that the transportation ways are typically several hundreds or thousands of kilometers long.

Another object of the current invention is a method for synthesizing a polyether-amido-amine-compound by a two-step reaction of a polyetheramine with an alkyl acrylate and a polyalkyleneimine, whereas the polyetheramine and the polyalkyleneimine have at least one primary or secondary amine group, in which the first step comprises the reaction of the polyetheramine with the alkyl acrylate and the second step comprises the reaction of the polyalkyleneimine with the product of the first step.

It has been found that this preparation method is especially practical as it allows the synthesis of differently structured composition just by modifying the ratios of the reactants. For example one mole of a polyether-amine with two end-standing primary amine groups can be reacted with one mole of methyl-acrylate or with two moles of methyl-acrylate. In the first case, only one, and in the second case both end-standing amine-groups of the polyether-amine are modified by the acrylate addition. As only the modified groups can react with the polyalkyleneimine in the second step, the ratio of polyetheramine and alkylacrylate allows to trigger the structure of the final polyether-amido-amine. Hence, the method of the current invention allows compared to the process as described in EP 0 379 107 A2 the preparation of a wider variety of curing agents which means that the curing agents may be better adapted for their later field of use.

According to a further embodiment of the compound and preparation method of the current invention, the first reaction step is conducted via an aza-Michael addition and/or the second step is conducted as a condensation reaction.

According to a preferred embodiment of the current invention, the polyetheramine has the general formula Ia or Ib

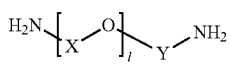 (formula Ia)

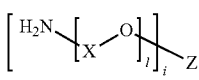 (formula Ib)

with X, Y being independently a substituted or unsubstituted, branched or unbranched bivalent group chosen from alkylene or arylene, in particular ethylene, n-propylene, i-propylene, n-butylene, i-butylene, tert-butylene, phenylene, tolylene or xylylene, Z being a substituted or unsubstituted, branched or unbranched i-valent alkyl, aryl-rest, i being an integer from 1 to 5, preferably 2 or 3 and 1 being an integer from 2 to 200, preferably from 2 to 150, more preferred from 3 to 10.

Referring to the polyetheramines of formulas Ia and Ib, it should be understood that X can stand for different groups in the same molecule. For example X can be ethyl and iso-propyl so that the polyetheramine has a polyether backbone of the type $(Et-O)_n-(iProp)_m$ for example.

Especially useful polyetheramine compositions are those available under the trademark JEFFAMINE® from Huntsman. These jeffamines can be linear, branched or may also have a comb-like structure. These are for example the linear JEFFAMINE® D Series, like D-230, D-400, D-2000 and D-4000, whereas the number gives the approximate molecular weight of the respective substance. Also useful are the JEFFAMINE® ED Series which differ from the JEFFAMINE® D Series in so far that the polyetheralkylene chain is composed from two different ether groups, namely ethyl-ether and iso-propyl ether groups. Also useful are the JEFFAMINE® compounds with a comb-like structure like JEFFAMINE® T-403 and T-5000 as well as XDJ-509.

According to a highly preferred embodiment of the current invention, the polyetheramine comprises at least one end-standing iso-propylamine, iso-butylamine or tert-butylamine group. This is particularly preferable because with these structures less side reactions in the first reaction step with the alkyl acrylate are observed, like a condensation reaction with the alkyl ester-side of the alkyl acrylate. It is believed that the end-standing amine group is sterically shielded by these substituents, hereby reducing the likelihood of ester condensation, while still allowing aza-michael addition.

A further development of the current invention is characterised in that the alkyl rest of the alkyl acrylate has up to 10 carbon atoms, in particular 1 to 5, preferably the alkyl rest is a methyl or an ethyl rest. These alkyl-rests, especially in form of a methyl or an ethyl rest, represent good leaving groups in form of methanol or ethanol. This allows easier removal of these substituents in the second reaction step, which is typically a condensation reaction.

According to another embodiment of the current invention the polyalkyleneimine has the general formula II

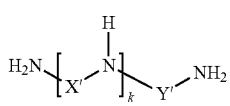 (formula II)

with X', Y' being independently a branched or unbranched bivalent group chosen from alkylene or arylene, in particular ethylene, n-propylene, i-propylene, butylene, i-butylene, phenylene, tolylene or xylylene and k being an integer from 2 to 100, preferably from 3 to 10.

It should be noted however that in industrial practice, polyethyleneimine grades are often complex mixtures. So it is known that in TEPA for example, the following compounds are present:

A: TEPA

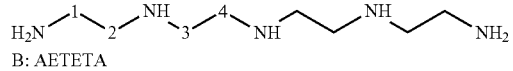

B: AETETA

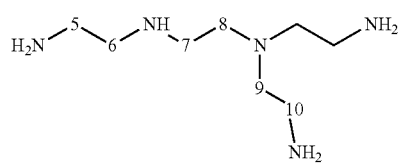

C: APEEDA

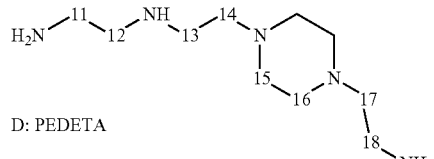

D: PEDETA

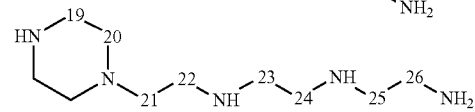

whereby the ideal TEPA structure A represents often only 30-50% of the total. Another example is presented with TETA:

A: TETA

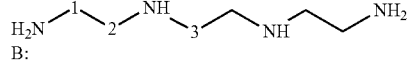

B:

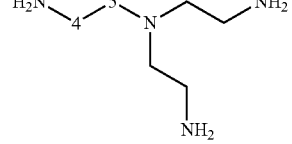

C:

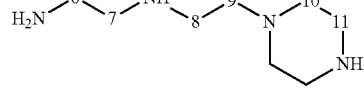

D:

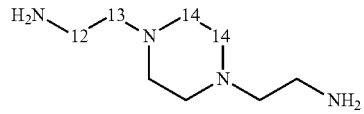

whereby the ideal TETA structure A represents often only 50-70% of the total.

It should therefore be understood in the context of the current invention that such technical mixtures can also be used.

The before mentioned polyalkyleneimines are especially preferred, because due to the fact that they have two end-standing primary amine groups, the condensation reaction with a polyetheramine-alkylacrylate-adduct preferably takes place preferably at these end-groups and typically not with the less-reactive secondary amines in the chain of the polyalkyleneimine.

Another preferred embodiment of the current invention is represented by that the mole ratio of polyetheramine:alkyl acrylate ranges from 10:1 to 1:4, in particular from 2:1 to 1:3 and/or the ratio of alkyl acrylate:polyalkyleneimine ranges from 5:1 to 1:1, in particular from 3:1 to 1:1.

Another example of those mole ratios is polyetheramine:alkyl acrylate ratio from 1.5:1 to 1:1.5 or 1.2:1 to 1:1.2 and/or the ratio of alkyl acrylate:polyalkyleneimine from 1.5:1 to 1:1 or 1.2:1 to 1:1.

If the ratios are chosen as non-integers, the reaction will result in mixtures of differently substituted molecules. For example a ratio of polyetheramine:alkyl acrylate of 1:1.2 leads to a adduct-mixture, in which about 80% of the polyetheramine is adducted with one molecule of alkyl acrylate and the remaining 20% with two molecules of alkyl acrylate, without considering possible side-reactions. After the condensation reaction with the polyalkyleneimine this leads to corresponding mixtures of differently substituted polyether-amido-amine compounds so that the properties of the resulting curing agent can be flexibly modified by altering the reactant ratios.

According to the current invention it is further preferred that the compound has the general formula III with x: 1-200 y: 0-200, z: 1 to 100, m,n: 0 to 2, m+n≥0.1,

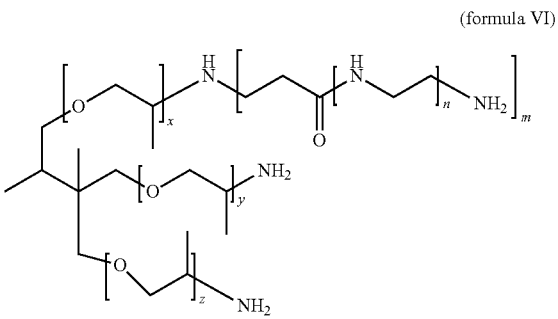
(formula VI)

with x,y,z: 1-200, n: 1 to 100, m≥0.1.

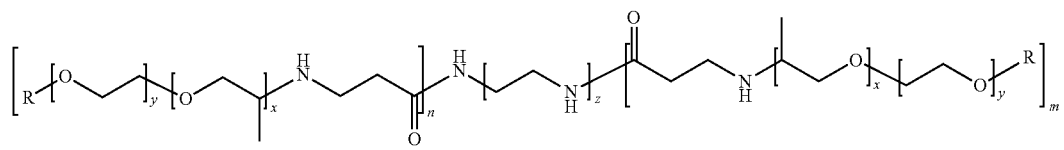
(formula III)

with x: 1-200, y: 0-200, z: 1 to 100, m,n: 0 to 2, m+n≥0.1, R=a single valent primary aliphatic or aromatic rest or amino-rest, in particular an ethyl, n-propyl, iso-propyl, n-butyl, sec-butyl or a tert-butyl rest, or an ethylamine, n-propylamine, iso-propylamine, n-butylamine, sec-butylamine or a tert-butylamine rest, in particular the general formula V (formula V)

with x: 1-200 y: 0-200, z: 1 to 100, m,n: 0 to 2, m+n≥0.1, or the general formula IV or VI:

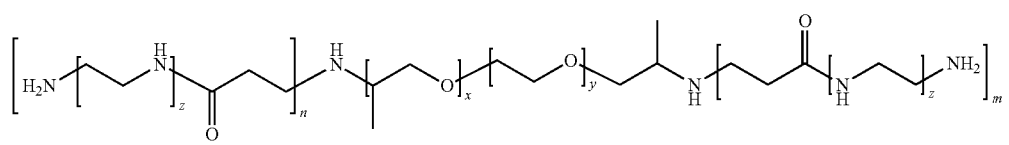
(formula IV)

In the following, an exemplary reaction scheme is given:

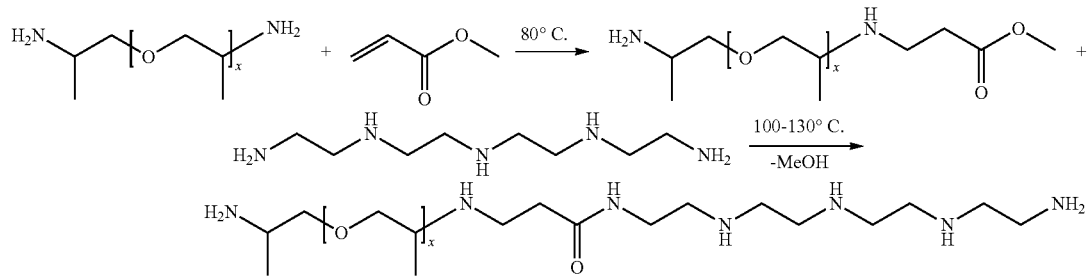

As explained above, depending on the ratio of the components, polyether-amido-amine compounds belonging to formula IV or V are obtained. For formula III and VI, the reaction is started with a monofunctional resp. trifunctional polyether amine.

The first reaction step can take place at temperatures from room temperature up to 100° C., whereas 60 to 90, especially about 80° C. are preferred.

In the second reaction step, the reaction temperature can be used to modify the selectivity of the reaction with respect to the amine groups of the polyetheramine. Whereas at a temperature between 80 to about 130° C. mostly the primary amine groups react, at temperatures of more than 130° C., the secondary amine groups take also part in the reaction. In general, if the reaction shall be limited to the primary amines, reaction temperatures of up to 130° C. are preferred, especially between 70 or 80° C. to 130° C.

It is also possible to produce mixtures of the before mentioned components by using mixtures of different polyether amine compounds for the reaction. Of course, it is possible as well to prepare the above mentioned compounds in separate reactions and to mix them in a later stage to be used as a curing composition.

Accordingly, the current invention is also directed to the use of a polyether-amido-amine-compound according to the current invention as a curing agent, in particular for epoxy or isocyanate systems.

Another embodiment of the current invention is a curable composition, in particular a coating, resin, sealant, structural adhesive or composite composition, comprising a curable compound, preferably an epoxy or an isocyanate resin and at least one polyether-amido-amine compound according to current invention as a curing agent.

The curable compositions according to the current invention can be in the one-part or in the two- or more-part form. To enhance the shelf-life of a one-part curable composition, it is advisable to deactivate the polyether-amido-amine curing agent for example by a coating. Preferably however, the curable compositions of this invention comprise a first part and at least a second part to be mixed together before use. Because of the reactivity of the curing agent with epoxy groups, the epoxy resin is separated in a first part from the curing agent in the second part prior to use of the curable composition.

This first part can include, besides the epoxy resin, other components that do not react with the epoxy resin or that react with only a portion of the epoxy resin. Likewise, the second part can include other components that do not react with the curing agent or that react with only a portion of the curing agent. Optionally present reactive liquid modifiers are typically added to the first part to avoid premature reaction with the curing agent. A toughening agent and other optional components such as an oil displacing agent may be included in the first part, in the second part, or in both the first part and the second part. When the first part and the second part are mixed together, the various components react to form the cured adhesive or coating composition.

The epoxy resin that is included in the first part contains at least one epoxy functional group (i.e., oxirane group) per molecule. As used herein, the term oxirane group refers to the following divalent group according to Formula (VII):

(VII)

The asterisks denote a site of attachment of the oxirane group to another group. If the oxirane group is at the terminal position of the epoxy resin, the oxirane group is typically bonded to a hydrogen atom.

(VIIa)

This terminal oxirane group is often part of a glycidyl group.

(VIIb)

The epoxy resin often has at least one oxirane group per molecule and often has at least two oxirane groups per molecule. For example, the epoxy resin can have 1 to 10, 2 to 10, 1 to 6, 2 to 6, 1 to 4, or 2 to 4 oxirane groups per molecule. The oxirane groups are usually part of a glycidyl group.

Epoxy resins can be a single material or a mixture of materials selected to provide the desired viscosity characteristics before curing and to provide the desired mechanical properties after curing. If the epoxy resin is a mixture of materials, at least one of the epoxy resins in the mixture is typically selected to have at least two oxirane groups per molecule. For example, a first epoxy resin in the mixture can have two to four oxirane groups and a second epoxy resin in the mixture can have one to four oxirane groups. In some of these examples, the first epoxy resin is a first glycidyl ether with two to four glycidyl groups and the second epoxy resin is a second glycidyl ether with one to four glycidyl groups.

The portion of the epoxy resin molecule that is not an oxirane group (i.e., the epoxy resin molecule minus the oxirane groups) can be aromatic, aliphatic or a combination thereof and can be linear, branched, cyclic, or a combination thereof. The aromatic and aliphatic portions of the epoxy resin can include heteroatoms or other groups that are not reactive with the oxirane groups. That is, the epoxy resin can include halo groups, oxy groups such as in an ether linkage group, thio groups such as in a thio ether linkage group, carbonyl groups, carbonyloxy groups, carbonylimino groups, phosphono groups, sulfono groups, nitro groups, nitrile groups, and the like. The epoxy resin can also be a silicone-based material such as a polydiorganosiloxane-based material.

Although the epoxy resin can have any suitable molecular weight, the weight average molecular is usually at least 100 grams/mole, at least 150 grams/mole, at least 175 grams/mole, at least 200 grams/mole, at least 250 grams/mole, or at least 300 grams/mole. The weight average molecular weight can be up to 50,000 gram/mole or even higher for polymeric epoxy resins. The weight average molecular weight is often up to 40,000 grams/mole, up to 20,000 grams/mole, up to 10,000 grams/mole, up to 5,000 grams/mole, up to 3,000 grams/mole, or up to 1,000 grams/mole. For example, the weight average molecular weight can be in the range of 100 to 50,000 grams/mole, in the range of 100 to 20,000 grams/mole, in the range of 10 to 10,000 grams/mole, in the range of 100 to 5,000 grams/mole, in the range of 200 to 5,000 grams/mole, in the range of 100 to 2,000 grams/mole, in the range of 200 to 2,000 gram/mole, in the range of 100 to 1,000 grams/mole, or in the range of 200 to 1,000 grams/mole.

Suitable epoxy resins are typically a liquid at room temperature (e.g., about 20° C. to about 25° C.). However, epoxy resins that can be dissolved in a suitable solvent also can be used. In most embodiments, the epoxy resin is a glycidyl ether. Exemplary glycidyl ethers can be of Formula (VIII).

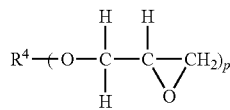

(VIII)

In Formula (VIII), group $R^4$ is a p-valent group that is aromatic, aliphatic, or a combination thereof. Group $R^4$ can be linear, branched, cyclic, or a combination thereof. Group $R^4$ can optionally include halo groups, oxy groups, thio groups, carbonyl groups, carbonyloxy groups, carbonylimino groups, phosphono groups, sulfono groups, nitro groups, nitrile groups, and the like. Although the variable p can be any suitable integer greater than or equal to 1, p is often an integer in the range of 2 to 4.

In some exemplary epoxy resins of Formula (VIII), the variable p is equal to 2 (i.e., the epoxy resin is a diglycidyl ether) and $R^4$ includes an alkylene (i.e., an alkylene is a divalent radical of an alkane and can be referred to as an alkane-diyl), heteroalkylene (i.e., a heteroalkylene is a divalent radical of a heteroalkane and can be referred to as a heteroalkane-diyl), arylene (i.e., a divalent radical of an arene compound), or mixture thereof. Suitable alkylene groups often have 1 to 20 carbon atoms, 1 to 12 carbon atoms, 1 to 8 carbon atoms, or 1 to 4 carbon atoms. Suitable heteroalkylene groups often have 2 to 50 carbon atoms, 2 to 40 carbon atoms, 2 to 30 carbon atoms, 2 to 20 carbon atoms, 2 to 10 carbon atoms, or 2 to 6 carbon atoms. The heteroatoms in the heteroalkylene can be selected from oxy, thio, or —NH— groups but are often oxy groups. Suitable arylene groups often have 6 to 18 carbon atoms or 6 to 12 carbon atoms. For example, the arylene can be phenylene. Group $R^4$ can further optionally include halo groups, oxy groups, thio groups, carbonyl groups, carbonyloxy groups, carbonylimino groups, phosphono groups, sulfono groups, nitro groups, nitrile groups, and the like. The variable p is usually an integer in the range of 2 to 4.

Some epoxy resins of Formula (VIII) are diglycidyl ethers where $R^4$ includes (a) an arylene group or (b) an arylene group in combination with an alkylene, heteroalkylene, or both. Group $R^4$ can further include optional groups such as halo groups, oxy groups, thio groups, carbonyl groups, carbonyloxy groups, carbonylimino groups, phosphono groups, sulfono groups, nitro groups, nitrile groups, and the like. These epoxy resins can be prepared, for example, by reacting an aromatic compound having at least two hydroxyl groups with an excess of epichlorohydrin. Examples of useful aromatic compounds having at least two hydroxyl groups include, but are not limited to, resorcinol, catechol, hydroquinone, p,p'-dihydroxydibenzyl, p,p'-dihydroxyphenylsulfone, p,p'-dihydroxybenzophenone, 2,2'-dihydroxyphenyl sulfone, and p,p'-dihydroxybenzo-phenone. Still other examples include the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylenphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.

Some commercially available diglycidyl ether epoxy resins of Formula (VIII) are derived from bisphenol A (i.e., bisphenol A is 4,4'-dihydroxydiphenylmethane). Examples include, but are not limited to, those available under the trade designation EPON (e.g., EPON 828, EPON 872, and EPON 1001) from Hexion Specialty Chemicals, Inc. in Houston, Tex., those available under the trade designation DER (e.g., DER 331, DER 332, and DER 336) from Dow Chemical Co. in Midland, Mich., and those available under the trade designation EPICLON (e.g., EPICLON 850) from Dainippon Ink and Chemicals, Inc. in Chiba, Japan. Other commercially available diglycidyl ether epoxy resins are derived from bisphenol F (i.e., bisphenol F is 2,2'-dihydroxydiphenylmethane). Examples include, but are not limited to, those available under the trade designation DER (e.g., DER 334) from Dow Chemical Co. and those available under the trade designation EPICLON (e.g., EPICLON 830) from Dainippon Ink and Chemicals, Inc.

Other epoxy resins of Formula (VIII) are diglycidyl ethers of a poly(alkylene oxide) diol. These epoxy resins can be referred to as diglycidyl ethers of a poly(alkylene glycol) diol. The variable p is equal to 2 and $R^4$ is a heteroalkylene having oxygen heteroatoms. The poly(alkylene glycol) can be copolymer or homopolymer. Examples include, but are not limited to, diglycidyl esters of poly(ethylene oxide) diol, diglycidyl esters of poly(propylene oxide) diol, and diglycidyl esters of poly(tetramethylene oxide) diol. Epoxy resins of this type are commercially available from Polysciences, Inc. in Warrington, Pa. such as those derived from a poly(ethylene oxide) diol or from a poly(propylene oxide) diol having a weight average molecular weight of about 400 grams/mole, about 600 grams/mole, or about 1000 gram/mole.

It is preferred that the epoxy resin comprises a polyether polyol having two to four glycidyl groups, preferably polyTHF glycidyl ether having two to four glycidyl groups.

Still other epoxy resins of Formula (VIII) are diglycidyl ethers of an alkane diol ($R^4$ is an alkylene and the variable p is equal to 2). Examples include a diglycidyl ether of 1,4-dimethanol cylcohexyl, diglycidyl ether of 1,4-butanediol, and diglycidyl ethers of the cycloaliphatic diol formed from a hydrogenated bisphenol A such as those commercially available under the trade designation EPONEX 1510 from Hexion Specialty Chemicals, Inc. of Columbus, Ohio.

Yet other epoxy resins include silicone resins with at least two glycidyl groups and flame retardant epoxy resins with at least two glycidyl groups (e.g., a brominated bisphenol-type epoxy resin having with at least two glycidyl groups such as that commercially available from Dow Chemical Co. in Midland, Mich. under the trade designation DER 580).

The epoxy resin is often a mixture of materials. For example, the epoxy resins can be selected to be a mixture that provides the desired viscosity or flow characteristics prior to curing. The mixture can include at least one first epoxy resin that is referred to as a reactive diluent that has a lower viscosity and at least one second epoxy resin that has a higher viscosity. The reactive diluent tends to lower the viscosity of the epoxy resin mixture and often has either a branched backbone that is saturated or a cyclic backbone that is saturated or unsaturated.

Examples of reactive diluents include, but are not limited to, the diglycidyl ether of resorcinol, the diglycidyl ether of cyclohexane dimethanol, the diglycidyl ether of neopentyl glycol, and the triglycidyl ether of trimethylolpropane. Diglycidyl ethers of cyclohexane dimethanol are commercially available under the trade designation HELOXY MODIFIER 107 from Hexion Specialty Chemicals in Columbus, Ohio and under the trade designation EPODIL 757 from Air Products and Chemical Inc. in Allentonwn, Pa.

Other reactive diluents have only one functional group (i.e., oxirane group) such as various monoglycidyl ethers. Some exemplary monoglycidyl ethers include, but are not limited to, alkyl glycidyl ethers with an alkyl group having 1 to 20 carbon atoms, 1 to 12 carbon atoms, 1 to 8 carbon atoms, or 1 to 4 carbon atoms. Some exemplary monoglycidyl ethers are commercially available under the trade designation EPODIL from Air Products and Chemical, Inc. in Allentown, Pa. such as EPODIL 746 (2-ethylhexyl glycidyl ether), EPODIL 747 (aliphatic glycidyl ether), and EPODIL 748 (aliphatic glycidyl ether).

In most embodiments, the epoxy resin includes one or more glycidyl ethers and does not include epoxy alkanes and epoxy esters. Epoxy alkanes and epoxy esters can be included in the curable compositions, however, as oil displacing agents.

The curable adhesive or coating composition typically includes at least 20 weight percent epoxy resin based on a combined weight of the first part and the second part (i.e., based on a total weight of the curable composition). For example, the curable composition can include at least 25 weight percent, at least 30 weight percent, at least 40 weight percent, or at least 50 weight percent epoxy resin. The curable composition often includes up to 90 weight percent epoxy resin. For example, the curable composition can include up 80 weight percent, up to 75 weight percent, up to 70 weight percent, up to 65 weight percent, or up to 60 weight percent epoxy resin. Some exemplary curable compositions contain 20 to 90 weight percent, 20 to 80 weight percent, 20 to 70 weight percent, 30 to 90 weight percent, 30 to 80 weight percent, 30 to 70 weight percent, 30 to 60 weight percent, 40 to 90 weight percent, 40 to 80 weight percent, 40 to 70 weight percent, 50 to 90 weight percent, 50 to 80 weight percent, or 50 to 70 weight percent epoxy resin.

The curable compositions according to the current invention may comprise further ingredients, for example at least one substance selected from a group comprising reactive modifiers, reactive diluents, oil-displacing agents, corrosion inhibitors, anti-oxidants, fillers, plasticizers, stabilizers, molecular sieves, further curing agents and accelerators. If the composition is in the two-part form, these further substances can be present in the first and/or second part.

Like the curing agent of the current invention, also the further curing agent needs to be blocked or present in core shell particles if it shall be added to the first part of the adhesive in order to avoid an unwanted curing reaction before the two parts of the adhesive are mixed. Otherwise the further curing agent is present in the second part of the adhesive composition.

The further curing agents have at least two primary amino groups, at least two secondary amino groups, or combinations thereof. That is, the curing agent has at least two groups of formula —$NR^{21}H$ where $R^{21}$ is selected from hydrogen, alkyl, aryl, or alkylaryl. Suitable alkyl groups often have 1 to 12 carbon atoms, 1 to 8 carbon atoms, 1 to 6 carbon atoms, or 1 to 4 carbon atoms. The alkyl group can be cyclic, branched, linear, or a combination thereof. Suitable aryl groups usually have 6 to 12 carbon atom such as a phenyl group. Suitable alkylaryl groups can be either an alkyl substituted with an aryl or an aryl substituted with an alkyl. The same aryl and alkyl groups discussed above can be used in the alkylaryl groups.

When the first part and the second part of the curable composition are mixed together, the primary and/or secondary amino groups of the curing agent react with the oxirane groups of the epoxy resin. This reaction opens the oxirane groups and covalently bonds the curing agent to the epoxy resin. The reaction results in the formation of divalent groups of formula —C(OH)H—$CH_2$—$NR^{21}$—.

The curing agent minus the at least two amino groups (i.e., the portion of the curing agent that is not an amino group) can be any suitable aromatic group, aliphatic group, or combination thereof. Some amine curing agents are of Formula (IV) with the additional limitation that there are at least two primary amino groups (i.e., —$NH_2$ groups), at least two secondary amino groups (i.e., —$NHR^{21}$ groups where $R^{21}$ is equal to an alkyl, aryl, or alkylaryl), or at least one primary amino group and at least one secondary amino group.

(IX)

Each $R^{22}$ is independently an alkylene, heteroalkylene, or combination thereof. Suitable alkylene groups often have 1 to 18 carbon atoms, 1 to 12 carbon atoms, 1 to 8 carbon atoms, 1 to 6 carbon atoms, or 1 to 4 carbon atoms. Suitable heteroalkylene groups have at least one oxy, thio, or —NH— group positioned between two alkylene groups. Suitable heteroalkylene groups often have 2 to 50 carbon atoms, 2 to 40 carbon atoms, 2 to 30 carbon atoms, 2 to 20 carbon atoms, or 2 to 10 carbon atoms with up to 20 heteroatoms, up to 16 heteroatoms, up to 12 heteroatoms, or up to 10 heteroatoms. The heteroatoms are often oxy groups. The variable q is an integer equal to at least one and can be up to 10 or higher, up to 5, up to 4, or up to 3. Each $R^{21}$ group is independently hydrogen, alkyl, aryl, or alkylaryl. Suitable alkyl groups for $R^{21}$ often have 1 to 12 carbon atoms, 1 to 8 carbon atoms, 1 to 6 carbon atoms, or 1 to 4 carbon atoms. The alkyl group can be cyclic, branched, linear, or a combination thereof. Suitable aryl groups for $R^{21}$ often have 6 to 12 carbon atoms such as a phenyl group. Suitable alkylaryl groups for $R^{21}$ can be either an alkyl substituted with an aryl or an aryl substituted with an alkyl. The same aryl and alkyl groups discussed above can be used in the alkylaryl groups.

Some amine curing agents can have an $R^{22}$ group selected from an alkylene group. Examples include, but are not limited to, ethylene diamine, diethylene diamine, diethylene triamine, triethylene tetramine, propylene diamine, tetraethylene pentamine, hexaethylene heptamine, hexamethylene diamine, 2-methyl-1,5-pentamethylene diamine, 1-amino-3-aminomethyl-3,3,5-trimethylcyclohexane (also called isophorone diamine), aminoethylpiperazine and the like. Other amine curing agents can have an $R^{22}$ group selected from a heteroalkylene group such as a heteroalkylene having oxygen heteroatoms. For example, the curing agent can be a compound such as aminoethylpiperazine, 4,7,10-trioxamidecane-1,13-diamine (TTD) available from TCI America in Portland, Oreg., or a poly(alkylene oxide) diamine (also called polyether diamines) such as a poly(ethylene oxide) diamine, poly(propylene oxide) diamine, or a copolymer thereof. Commercially available polyether diamines are commercially available under the trade designation JEFFAMINE form Huntsman Corporation in The Woodlands, Tex.

Still other amine curing agents can be formed by reacting a polyamine (i.e., a polyamine refers to an amine with at least two amino groups selected from primary amino groups and secondary amino groups) with another reactant to form an amine-containing adduct having at least two amino groups. For example, a polyamine can be reacted with an epoxy resin to form an adduct having at least two amino groups. If a polymeric diamine is reacted with a dicarboxylic acid in a molar ratio of diamine to dicarboxylic acid that is greater than or equal to 2:1, a polyamidoamine having two amino groups can be formed. In another example, if a polymeric diamine is reacted with an epoxy resin having two glycidyl groups in a molar ratio of diamine to epoxy resin greater than or equal to 2:1, an amine-containing adduct having two amino groups can be formed. A molar excess of the polymeric diamine is often used so that the curing agent includes both the amine-containing adduct plus free (non-reacted) polymeric diamine. For example, the molar ratio of diamine to epoxy resin with two glycidyl groups can be greater than 2.5:1, greater than 3:1, greater than 3.5:1, or greater than 4:1. Even when epoxy resin is used to form the amine-containing adduct in the second part of the curable composition, additional epoxy resin is present in the first part of the curable composition.

The curing agent can be a mixture of materials. For example, the curing agent can include a first curing agent that is a polymeric material added to enhance flexibility of the cured adhesive composition plus a second curing agent that is added to alter the glass transition temperature of the cured adhesive composition.

The curable compositions usually contain at least 3 weight percent curing agent based on a total weight of the curable composition. For example, the total curable composition can contain at least 3 weight percent, at least 5 weight percent, or at least 10 weight percent of the curing agent. The adhesive composition typically includes up to 35 weight percent, up to 25 weight percent, up to 20 weight percent, or up to 15 weight percent of the curing agent. For example, the curable composition can contain 3 to 35 weight percent, 3 to 25 weight percent, 3 to 20 weight percent, 3 to 15 weight percent, 3 to 10 weight percent, 5 to 35 weight percent, 5 to 25 weight percent, 5 to 20 weight percent, or 5 to 15 weight percent of the curing agent.

The further curing agents may comprise other curing agents typically considered to be secondary curatives because, compared to curing agents having at least two groups of formula —$NHR^{21}$, they are not as reactive with the oxirane rings of the epoxy resins at room temperature. These secondary curatives are often imidazoles or salts thereof, imidazolines or salts thereof, or phenols substituted with tertiary amino groups. Suitable phenols substituted with tertiary amino groups can be of Formula (IXa).

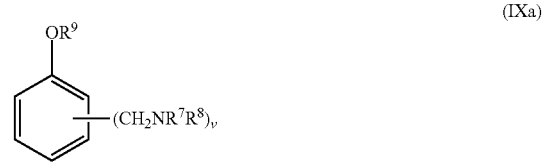

(IXa)

In Formula (IXa), each group $R^7$ and $R^8$ is independently an alkyl. The variable v is an integer equal to 2 or 3. Group $R^9$ is hydrogen or alkyl. Suitable alkyl groups for $R^7$, $R^8$, and $R^9$ often have 1 to 12 carbon atoms, 1 to 8 carbon atoms, 1 to 6 carbon atoms, or 1 to 4 carbon atoms. One exemplary secondary curative of Formula (IXa) is tris-2,4,6-(dimethylaminomethyl)phenol that is commercially available under the trade designation ANCAMINE K54 from Air Products Chemicals, Inc. of Allentown, Pa.

According to the current invention, the further curing agent may also be chosen from substances, which possess other functionalities as well, like reactive dilute capabilities. Examples for further curing agents that also work as reactive diluents are 1-(2-aminoethyl) piperazine (AEP) and 4-(3-aminopropyl) morpholine (APM).

The optional secondary curative can be present in the first part of the curable composition with the epoxy resin and the reactive liquid modifier or in the second part of the curable composition with the curing agent. The amount of the secondary curative is typically up to 6 weight percent, up to 5 weight percent, or up to 4 weight percent base on a total weight of the curable composition. If included in the first part, the secondary curative can be present in an amount in the range of 0 to 15 weight percent, in the range of 0.5 to 10 weight percent, or in the range of 1 to 5 weight percent based on a total weight of the first part. If included in the second part (curing agent side), the secondary curative can be present in an amount in the range of 0 to 5 weight percent, in the range of 0.5 to 5 weight percent, or in the range of 1 to 5 percent based on a total weight of the second part.

A reactive liquid modifier is added to the curable composition to enhance the flexibility of that composition in the cured state, to further enhance the impact resistance, to enhance the effect of a toughening agent or combinations thereof. A reactive liquid modifier may be of the formula (X).

Group R" is hydrogen or an alkyl. Suitable alkyl groups for R" in Formula (V) often have 1 to 10 carbon atoms, 1 to 8 carbon atoms, 1 to 6 carbon atoms, or 1 to 4 carbon atoms. The alkyl group can be linear, branched, cyclic, or a combination thereof. In many embodiments, $R^2$ is methyl. That is, the terminal groups of the reactive liquid modifier can be acetoacetoxy groups. Group R' is an aliphatic group having at least 8 carbon atoms. This aliphatic group has at least one alkene-diyl group and at least one divalent oxirane group. Y represents O, S or NH, 1 being an integer from 1 to 10, preferably from 1 to 3.

The reactive liquid modifiers of Formula (X) can be prepared, for example, by reacting an alkyl acetoacetoxy compound with a polymeric material having at least two hydroxyl groups, at least one alkene-diyl group, and at least one divalent oxirane group. This polymeric material that is reacted with the alkyl acetoacetoxy group typically has at last one carbon-carbon double bond, at least one oxirane group, and terminal hydroxyl groups. This polymeric material is often formed by (1) polymerizing a 1,3-alkanediene and then (2) partially epoxidizing the carbon-carbon double bonds in the resulting poly(1,3-alkanediene). Alternatively, the polymeric material can be formed by (1) polymerizing a polymerizable composition that includes a first monomer selected from a 1,3-alkanediene and a second monomer having at least one carbon-carbon double bond that can react with the 1,3-alkanediene and then (2) partially epoxidizing the carbon-carbon double bonds in the resulting copolymeric material (i.e., co-poly(1,3-alkanediene). The partially epoxidized polymeric material typically has terminal hydroxyl groups. Some exemplary partially epoxidized polymeric materials are partially epoxidized poly(butadiene) with terminal hydroxyl groups.

The poly(1,3-alkanediene) or co-poly(1,3-alkanediene) can have any suitable molecular weight. Some suitable polymeric materials have a number average molecular weight that is at least 200 grams/mole, at least 250 grams/mole, at least 500 grams/mole, at least 750 grams/mole, or at least 1,000 grams/mole. The number average molecular weight is often up to 10,000 grams/mole, up to 5,000 gram/mole, up to 3,000 grams/mole, or up to 2,000 grams/mole. For example, the number average molecular weight can be in the range of 200 to 5,000 grams/mole, in the range of 500 to 3,000 grams/mole, in the range of 1000 to 3,000 grams/mole.

The epoxy equivalent weight of the poly(1,3-alkanediene) or co-poly(1,3-alkanediene) can be any suitable value. Some such polymeric materials have an epoxy equivalent weight equal to at least 150 grams/equivalent, at least 200 grams/equivalent, at least 250 grams/equivalent, or at least 300 grams/equivalent. The epoxy equivalent weight is often up to 1,000 grams/equivalent or even higher, up to 800 grams/equivalent, or up to 600 grams/equivalent. For example, the epoxy equivalent weight can be in the range of 150 to 1,000 grams/equivalent, in the range of 200 to 800 grams/equivalent, or in the range of 200 to 600 grams/equivalent.

Some suitable partially epoxidized poly(butadiene) materials are commercially available from Sartomer in Exton, Pa. under the trade designation POLY BD such as POLY BD 600, POLY BD 605, POLY BD 600E, and POLY BD 605E.

The partially epoxidized polymeric material (e.g., partially epoxidized poly(1,3-alkanediene) or co-poly(1,3-alkenediene)) often has two terminal hydroxyl groups. The reaction of the partially epoxidized polymeric material can be reacted with an alkyl acetoacetoxy compound as described in the article by J. S. Witzeman et al. in J. Org. Chem., 56(5), 1713-1718, 1991. The hydroxyl groups of the partially epoxidized polymeric materials react with the alkyl acetoacetoxy groups resulting in the formation of the compound of Formula (V). Suitable alkyl acetoacetoxy compounds often have an alkyl group with tertiary carbon such as in a tert-butyl group.

Alternatively, the reactive liquid modifiers of Formula (V) can be prepared by reacting a diketone with hydroxyl functional materials as described by R. J. Clemens in Chem. Rev., 86, 241 (1986).

The reactive liquid modifier of Formula (X) is typically not reactive with the epoxy resin but is reactive with the curing agent. The reactive liquid modifier is usually added to the first part of the curable composition to minimize premature reaction with the curing agent in the second part. The reactive liquid modifier is typically not reactive at room temperature with the secondary curatives and can be mixed with such materials in the first part of the curable composition.

The reactive liquid modifier can react with the curing agent having primary amino groups, secondary amino groups, or a mixture of primary and secondary amino groups. The primary amino or secondary amino groups can react with the terminal carbonyl group of the reactive liquid modifier. For purposes of simplicity, the reaction of a single primary amino group of the curing agent ($H_2N$—R'"—$NH_2$) or a curing agent according to this invention with one terminal carbonyl group of the reactive liquid modifier is shown in the following reaction.

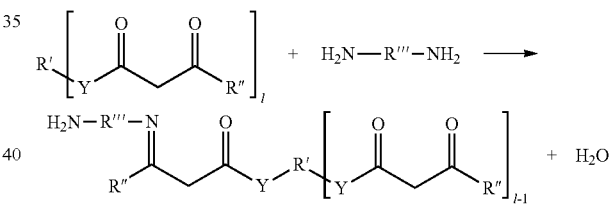

This reaction between the curing agent and the reactive liquid modifier typically occurs at a faster rate than the reaction between the curing agent and the epoxy resin. Any curing agent not consumed by the reaction with the reactive liquid modifier can then be reacted with the epoxy resin.

The curable composition often contains at least 3 weight percent of the reactive liquid modifier based on a total weight of the curable composition. The reactive liquid modifier is often present in an amount equal to at least 4 weight percent, at least 5 weight percent, at least 7 weight percent, or at least 10 weight percent based on the total weight of the curable composition. The curable composition often contains up to 20 weight percent of the reactive liquid modifier. This amount can be up to 18 weight percent, up to 15 weight percent, or up to 12 weight percent. For example, the reactive liquid modifier is often in the range of 3 to 20 weight percent, 4 to 20 weight percent, 4 to 15 weight percent, 4 to 12 weight percent, 4 to 10 weight percent, or 5 to 10 weight percent based on the total weight of the curable composition.

If the curing reaction occurs at room temperature, the curing agent in the curable composition, the ratio of amine hydrogen equivalent weight to epoxy equivalent weight is often at least 0.5:1, at least 0.8:1, or at least 1:1. The ratio can up be to 2:1 or up to 1.5:1. For example, the ratio can be in the range of 0.5:1 to 2:1, in the range of 0.5:1 to 1.5:1, in the range of 0.8:1 to 2:1, in the range of 0.8:1 to 1.5:1, in the range of 0.8:1 to 1.2:1, in the range of 0.9:1 to 1.1:1, or about 1:1. The ratio is often selected so that there is sufficient amine curing agent present to react with both the epoxy resin and the reactive liquid modifier.

If the curing temperature occurs at elevated temperatures (e.g., temperatures above 100° C. or above 120° C. or above 150° C.), however, a lower amount of the amine curing agent is often used. The amount of the curing agent in the curable adhesive or coating composition is often present in a sufficient molar amount to react with the reactive liquid modifier and with a portion of the epoxy resin. For example, the ratio of amine hydrogen equivalent weight to epoxy equivalent weight is often less than 1:1 such in the range of 0.2:1 to 0.8:1, in the range of 0.2:1 to 0.6:1, or in the range of 0.3:1 to 0.5:1. Any epoxy resin that is not reacted with the curing agent tends to undergo homopolymerization at elevated temperatures.

The cured composition is less likely to crack or break upon impact when the reactive liquid modifier is included in the curable composition. That is, the reactive liquid modifier typically improves the impact peel strength of the cured composition. This is especially useful, if the cured composition is an adhesive. The impact peel strength is usually greater than 13 Newtons per millimeter (N/mm), greater than 15 N/mm, greater than 20 N/mm, greater than 25 N/mm, or greater than 30 N/mm.

In addition to the epoxy resin, curing agent, reactive liquid modifier, and toughening agent, the curable compositions can optionally further include an oil displacing agent that is soluble in the curable composition. The oil displacing agent can be added to the first part of the curable composition containing the epoxy resin and the reactive liquid modifier, to the second part of the curable composition containing the curing agent, or to both the first part and the second part. The oil displacing agent can be added to promote adhesion between the cured composition and the surface of a substrate that is contaminated with a hydrocarbon-containing material.

As used herein, the term "hydrocarbon-containing material" refers to a variety of substances that can contaminate the surface of the substrate during processing, handling, storage, or combinations thereof. Examples of hydrocarbon-containing materials include, but are not limited to, mineral oils, fats, dry lubricants, deep drawing oils, corrosion protection agents, lubricating agents, waxes, and the like. The surface of the substrate may contain other contaminants in addition to the hydrocarbon-containing material. While not wishing to be bound by theory, the oil displacing agent may facilitate transfer of the hydrocarbon-containing away from the surface of the substrate and into the bulk of the curable composition. This transfer away from the surface of the substrate may result in improved adhesive bond strength. Sufficient adhesive bond strength can often be obtained without the need for a heat curing step.

The optionally present oil displacing agents are usually liquids at room temperature. These agents are typically capable of disrupting or displacing hydrocarbon-containing material at the surface of the substrate while remaining miscible both with the curable composition during application and with the resulting cured composition. Suitable oil displacing agents often have a surface tension that is lower than that of the hydrocarbon-containing material and a solubility parameter similar to that of the hydrocarbon-containing material.

The oil displacing agents usually have a surface tension up to 35 dynes per centimeter (dynes/cm). For example, the surface tension can be up to 35 dynes/cm, up to 32 dynes/cm, up to 30 dynes/cm, or up to 25 dynes/cm. The surface tension is often at least 15 dynes/cm, at least 18 dynes/cm, or at least 20 dynes/cm. For example, the surface tension can be in the range of 15 to 35 dynes/cm, in the range of 15 to 32 dynes/cm, in the range of 15 to 30 dynes/cm, in the range of 20 to 35 dynes/cm, in the range of 20 to 30 dynes/cm, in the range of 25 to 35 dynes/cm, or in the range of 25 to 30 dynes/cm. The surface tension can be measured, for example, using the so-called pendant drop test (also referred to as the pendant drop shape analysis method) as specified in the article by F. K. Hansen et al. in *J. Coll. and Inter. Sci.*, 141, 1-12 (1991).

If the hydrocarbon-containing material on the surface of the substrate is known, the oil displacing agent can be selected to have a surface tension that is less than the surface tension of the hydrocarbon-containing material. More specifically, the oil displacing agent can be selected to have a surface tension that is at least 2.5 dynes/cm less than that of the hydrocarbon-containing material. For example, the surface tension of the oil displacing agent can be at least 4.0 dynes/cm less than, at least 8.0 dynes/cm less than, or at least 12.0 dynes/cm less than that of the hydrocarbon-containing material.

In many embodiments, the solubility parameter of the oil displacing agent is in the range of 6 to 12 $cal^{0.5}/cm^{1.5}$. For example, the solubility parameter can be in the range of 7 to 12 $cal^{0.5}/cm^{1.5}$, in the range of 8 to 12 $cal^{0.5}/cm^{1.5}$, in the range of 7 to 10.5 $cal^{0.5}/cm^{1.5}$, in the range of 7 to 9 $cal^{0.5}/cm^{1.5}$ or in the range of 7.5 to 9 $cal^{0.5}/CM^{1.5}$. The solubility parameter can be calculated with software commercially available under the trade designation MOLECULAR MODELING PRO from ChemSW, Inc. of Fairfield, Calif. using the method described by D. W. van Krevelen in the book *Properties of Polymers: Their Correlation with Chemical Structure: Their Numerical Estimation and Prediction Form Additive Group Contributions*, 4$^{th}$ edition, pp. 200-225, 1990, published by Elsevier in Amsterdam, The Netherlands.

Empirical methods can be used to identify suitable oil displacing agents for a particular application. For example, approximately 20 to 100 microliters of a candidate oil displacing agent can be gently deposited on the surface of a substrate covered with a film of the hydrocarbon-containing material. Suitable candidate oil displacing agents will typically spread out and cause the film of hydrocarbon-containing material to rupture. While not wishing to be bound by theory, suitable oil displacing agents are believed to at least partially dissolve the hydrocarbon-containing material and/or to at least partially diffuse into the hydrocarbon-containing material. The droplet of suitable oil displacing agents tends to push the hydrocarbon-containing material outward from the impact area.

Although empirical methods can facilitate the relatively quick identification of potential oil displacing agents, not all compounds that pass such a test can be used successfully as oil displacing agents based on other considerations. For example, some compounds can cause film rupture but are too volatile in the curable compositions or not suitably miscible with the curable composition to be effective as oil displacing agents.

Many different classes of compounds are suitable for the oil displacing agent. Suitable types of compounds include, but are not limited to, glycidyl esters, cyclic terpenes, cyclic terpene oxides, mono-esters, di-esters, tri-esters, trialkyl phosphates, epoxy alkanes, alkyl methacrylates, vinyl alkyl esters, alkanes, and alcohols. The oil displacing agent is typically not a glycidyl ether.

Some oil displacing agents are glycidyl esters of Formula (XI).

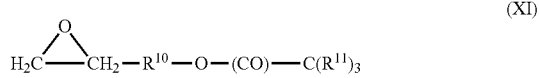

In Formula (XI), group $R^{10}$ is an alkylene having 1 to 18 carbon atoms, 1 to 12 carbon atoms, 1 to 10 carbon atoms, 1 to 8 carbon atoms, 1 to 6 carbon atoms, or 1 to 4 carbon atoms. In some exemplary compounds of Formula (XI), group $R^{10}$ is methylene. Each group $R^{11}$ is independently a linear or branched alkyl have 1 to 12 carbon atoms, 1 to 10 carbon atoms, 1 to 8 carbon atoms, 1 to 6 carbon atoms, or 1 to 4 carbon atoms. One exemplary compound of Formula (XI) is commercially available under the trade designation CARDURA N10 from Hexion Specialty Chemicals in Columbus, Ohio. This oil displacing agent is a glycidyl ester of a highly branched tertiary carboxylic acid (neodecanoic acid) having 10 carbon atoms.

Some oil displacing agents are esters. Suitable mono-esters can be of Formula (XIa).

In Formula (XIa), the group $R^{13}$ is usually a linear or branched alkyl having 1 to 20 carbon atoms, 1 to 18 carbon atoms, 1 to 12 carbon atoms, or 1 to 8 carbon atoms. Group $R^{12}$ is an alkyl, an alkene-yl (i.e., an alkene-yl is a monovalent radical of an alkene), an aryl, or an arylalkyl. Suitable alkyl and alkene-yl groups for $R^{12}$ often have 6 to 20 carbon atoms, 8 to 20 carbon atoms, 8 to 18 carbon atoms, or 8 to 12 carbon atoms. The alkyl and alkene-yl can be unsubstituted or substituted with a hydroxyl group, an amino group, an aryl group, or an alkylaryl group. Suitable amino group substituents are of formula —N($R^1$)$_2$ where each $R^1$ is independently an hydrogen, alkyl, aryl, or alkylaryl. Suitable aryl groups for $R^1$, $R^{12}$, and substituents often have 6 to 12 carbon atoms. The aryl group is often phenyl. Suitable alkyl groups for $R^1$ often have 1 to 10 carbon atoms, 1 to 6 carbon atoms, or 1 to 4 carbon atoms. Suitable arylalkyl groups for $R^1$, $R^{12}$, and substituents often have an alkyl portion with 1 to 12 carbon atoms, 1 to 8 carbon atoms, or 1 to 4 carbon atoms and an aryl portion having 6 to 12 carbon atoms such as phenyl. Exemplary oil displacing agents of Formula (XIa) include, but are not limited to, alkyl oleates such as methyl oleate and alkyl benzoates such as isodecyl benzoate.

Suitable di-esters of use as oil displacing agents can be of Formula (XIb).

In Formula (XIb), each group $R^{14}$ independently is a linear or branched alkyl having at least 3 carbon atoms such as 3 to 20 carbon atoms, 3 to 18 carbon atoms, 3 to 12 carbon atoms, or 3 to 8 carbon atoms. Group $R^{15}$ is an alkane-diyl (i.e., an alkane-diyl is a divalent radical of an alkane and can be referred to as an alkylene), a heteroalkane-diyl (i.e., a heteroalkane-diyl is a divalent radical of a heteroalkane and can be referred to as a heteroalkene), or an alkene-diyl (i.e., an alkene-diyl is a divalent radical of an alkene). The alkane-diyl, heteroalkane-diyl, and alkene-diyl have at least 2 carbon atoms and often have 2 to 20 carbon atoms, 2 to 16 carbon atoms, 2 to 12 carbon atoms, or 2 to 8 carbon atoms. The heteroatom in the heteroalkylene-diyl can be oxy, thio, or —NH—. The alkane-diyl, heteroalkane-diyl, and alkene-diyl can be unsubstituted or substituted with a hydroxyl group, an amino group, an aryl group, or alkylaryl group. Suitable amino group substituents are of formula —N($R^1$)$_2$ where $R^1$ is an hydrogen, alkyl, aryl, or alkylaryl. Suitable aryl groups for $R^1$ and substituents often have 6 to 12 carbons such as a phenyl group. Suitable alkylaryl groups for $R^1$ and substituents often have an alkyl portion with 1 to 12 carbon atoms, 1 to 8 carbon atoms, or 1 to 4 carbon atoms and an aryl portion with 6 to 12 carbon atoms such as phenyl. Suitable alkyl groups for $R^1$ often have 1 to 12 carbon atoms, 1 to 8 carbon atoms, or 1 to 4 carbon atoms. Exemplary di-esters of Formula (VII) include, but are not limited to, dialkyl maleates such as diethylhexyl maleate, dialkyl adipates such as diisobutyl adipate, dialkyl succinates such as diisobutyl succinate, dialkyl glutarates such as diisobutyl glutarate, dialkyl fumarates such as dibutyl fumarate, and dialkly glutamates such as dibutyl glutamate.

Suitable tri-esters for use as oil displacing agents can be of Formula (XIc).

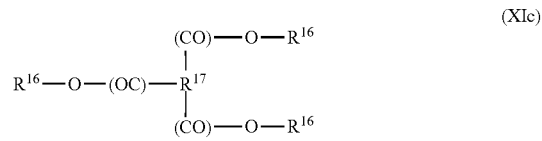

In Formula (XIc), each $R^{16}$ group independently is a linear or branched alkyl having at least 3 carbon atoms such as 3 to 20 carbon atoms, 3 to 18 carbon atoms, 3 to 12 carbon atoms, or 3 to 8 carbon atoms. Group $R^{17}$ is an alkane-triyl (i.e., an alkane-triyl is a trivalent radical of an alkane), heteroalkane-triyl (i.e., a heteroalkane-triyl is a trivalent radical of a heteroalkane), or alkene-triyl (i.e., a alkene-triyl is a trivalent radical of an alkene). The alkane-triyl, heteroalkane-triyl, and alkene-triyl have at least 2 carbon atoms and often have 2 to 20 carbon atoms, 2 to 16 carbon atoms, 2 to 12 carbon atoms, or 2 to 8 carbon atoms. The heteroatom in the heteroalkylene-diyl can be oxy, thio, or —NH—. The alkane-triyl, heteroalkane-triyl, and alkene-triyl can be unsubstituted or substituted with a hydroxyl group, an amino group, an aryl group, or alkylaryl group. Suitable amino group substituents are of formula —N($R^1$)$_2$ where $R^1$ is an hydrogen, alkyl, aryl, or alkylaryl. Suitable aryl groups for $R^1$ and substituents often have 6 to 12 carbons such as a phenyl group. Suitable alkylaryl groups for $R^1$ and substituents often have an alkyl portion with 1 to 12 carbon atoms, 1 to 8 carbon atoms, or 1 to 4 carbon atoms and an aryl portion with 6 to 12 carbon atoms such as phenyl. Suitable alkyl groups for $R^1$ often have 1 to 12 carbon atoms, 1 to 8 carbon atoms, or 1 to 4 carbon atoms. Exemplary compounds of Formula (XIc) include, but are not limited to, trialkyl citrates such as tributyl citrate.

The oil displacing agent can be selected from an epoxy alkane of Formula (XId).

In Formula (XId), group $R^{18}$ is an alkyl or perfluoroalkyl. The alkyl or perfluoroalkyl group can be linear, branched, cyclic, or a combination thereof. The alkyl or perfluoroalkyl group often has at least 3 carbon atoms such as 3 to 20 carbon atoms, 4 to 20 carbon atoms, 4 to 18 carbon atoms, 4 to 12 carbon atoms, or 4 to 8 carbon atoms. Exemplary compounds of Formula (IX) include, but are not limited to, 1H,1H,2H-perfluoro(1,2-epoxy)hexane, 3,3-dimethyl-1,2-epoxybutane, 1,2-epoxyoctane, 1,2-epoxyhexane, 1,2-epoxybutane, 1,2-epoxydodecane, 1,2-epoxydecane, and 1,2-epoxycyclopentane.

Suitable cyclic terpenes for use as oil displacing agents include, but are not limited to, limonene, alpha-pinene, beta-pinene, 1,8-cineole, and the like. Suitable cyclic terpene oxides include, but are not limited to, limonene oxide and alpha-pinene oxide.

Trialkyl phosphates suitable for use as oil displacing agents often have alkyl groups with 2 to 10 carbon atoms. Some exemplary trialkyl phosphates include, but are not limited to, tripropyl phosphate, triethylphosphate, and tributyl phosphate.

Alkyl methacrylates that can be used as oil displacing agents often include an alkyl group with at least 4 carbon atoms, at least 6 carbon atoms, or at least 8 carbon atoms. For example, the alkyl group can have 6 to 20 carbon atoms, 6 to 18 carbon atoms, 6 to 12 carbon atoms, or 6 to 10 carbon atoms. The alkyl in the alkyl methacrylate can be cyclic, linear, branched, or a combination thereof. Examples include, but are not limited to, isodecyl methacrylate, 3,3,5-trimethylcyclohexyl methacrylate.

Vinyl alkyl esters suitable for use as oil displacing agents often have an alkyl group that has at least 2 carbon atoms, at least 4 carbon atoms, or at least 6 carbon atoms. For example, the alkyl group can have 2 to 20 carbon atoms, 4 to 20 carbon atoms, 4 to 18 carbon atoms, 4 to 12 carbon atoms, or 4 to 8 carbon atoms. The alkyl in the vinyl alkyl ester can be cyclic, linear, branched, or a combination thereof. Examples include, but are not limited to, VEOVA 10, a vinyl ester of a highly branched carboxylic acid having 10 carbon atoms. VEOVA 10 is a trade designation of Hexion Specialty Chemicals in Columbus, Ohio.

Alkyl trialkoxysilane compounds that can be used as oil displacing agents often include an alkyl group having 1 to 10 carbon atoms, 2 to 10 carbon atoms, or 2 to 6 carbon atoms. The alkyl group can be unsubstituted or substituted with an amino group such as a primary amino group. The alkoxy groups often have 1 to 6 carbon atoms, 1 to 4 carbon atoms, or 1 to 3 carbon atoms. Examples include, but are not limited to, 3-aminopropyltriethoxysilane.

Alkanes that can be used as oil displacing agents often contain at least 6 carbon atoms. For example the alkanes can have at least 8 carbon atoms, at least 10 carbon atoms, or at least 12 carbon atoms. Examples include, but are not limited to, n-heptane, n-decane, n-undecane, and n-dodecane.

Alcohols that can be used as the oil displacing agents often contain at least 6 carbon atoms, at least 8 carbon atoms, or at least 12 carbon atoms. Examples include, but are not limited to, 1-octanol, 2-octanol, and 1-decanol.

Table 1 includes surface tension values and solubility parameter values for exemplary oil displacing agents.

TABLE 1

Characteristics of Various Oil Displacing Agents

| Oil Displacing Agent | Surface Tension (dynes/cm) | Solubility Parameter $(cal^{0.5}/cm^{1.5})$ |
|---|---|---|
| 1H,1H,2H-Perfluoro(1,2-Epoxy)hexane | 15.6 | 9.43 |
| 3-[2-(Perfluorohexyl)ethoxy]1,2-Epoxypropane | 18.3 | 9.17 |
| 3,3-Dimethyl-1,2-Epoxybutane | 21.4 | 8.11 |
| 1,2-Epoxyoctane | 23.2 | 8.12 |
| 1,2-Epoxyhexane | 23.9 | 8.31 |
| 1,2-Epoxybutane | 24.3 | 8.31 |
| 1,2-Epoxydodecane | 25.1 | 8.08 |
| 1,2,7,8-Diepoxyoctane | 26.6 | 9.07 |
| 1,2-Epoxydecane | 27.8 | 8.10 |
| 1,2-Epoxycyclopentane | 30.4 | 9.13 |
| Cyclohexene Oxide | 31.6 | 8.93 |
| n-Decane | 22.7 | 7.41 |
| n-Heptane | 20.3 | 7.19 |
| 1-Octanol | 25.2 | 9.66 |
| 2-Octanol | 26.5 | 9.57 |
| 3-aminopropyltriethoxysilane | 23.5 | 9.37 |
| VEOVA 10 | 23.8 | 8.42 |
| a-Pinene | 26.3 | 8.06 |
| b-Pinene | 27.8 | 8.33 |
| Limonene | 26.9 | 8.02 |
| 1,8-Cineole | 29.3 | 8.65 |
| b-Pinene Oxide | 30.2 | 9.00 |
| Limonene Oxide | 31.4 | 8.80 |
| a-Pinene Oxide | 31.4 | 8.89 |
| Methyl Oleate | 29.0 | 8.19 |
| Isodecyl Benzoate | 29.6 | 9.19 |
| Dimethyl Adipate | 31.2 | 9.58 |
| Dibutyl Maleate | 27.6 | 9.08 |
| Dibutyl Fumarate | 28.7 | 9.08 |
| Diethylhexyl Maleate | 25.6 | 8.60 |
| Triethyl Citrate | 32.1 | 11.10 |
| Tributyl Citrate | 26.9 | 10.24 |
| Tributyl Phosphate | 26.9 | 9.17 |
| CARDURA N-10 | 28.9 | 8.84 |
| 3,3,5-Trimethylcyclohexyl Methacrylate | 26.7 | 8.10 |
| 1,3-Bis(Glycidoxypropyl)-tetramethyldisiloxane | 30.4 | 8.63 |
| 2,(3,4-Epoxycyclohexyl)-Ethyl Trimethoxysilane | 31.2 | 8.70 |

The curable compositions often contain at least 0.01 weight percent of the oil displacing agent based on a total weight of the curable composition. The amount is often at least 0.05 weight percent, at least 0.1 weight percent, at least 0.2 weight percent, at least 0.5 weight percent, or at least 1 weight percent. The curable composition can include up to 25 weight percent, up to 20 weight percent, up to 15 weight percent, or up to 10 weight percent of the oil displacing agent. In many embodiments, the oil displacing agent is present in an amount in the range of 0.1 to 25 weight percent, in the range of 0.5 to 20 weight percent, in the range of 1 to 20 weight percent, in the range of 1 to 10 weight percent, or in the range of 2 to 10 weight percent.

Some curable compositions contain at least 20 weight percent epoxy resin, at least 3 weight percent curing agent, at least 5 weight percent reactive liquid modifier, at least 5 weight percent toughening agent, and at least 0.1 weight percent oil displacing agent based on a total weight of the curable composition. Some exemplary curable compositions contain 20 to 90 weight percent epoxy resin, 3 to 30 weight percent curing agent, 3 to 20 weight percent reactive liquid modifier, 5 to 55 weight percent toughening agent, and 0.1 to 25 weight percent oil displacing agent based on a total weight of the curable composition. Other exemplary curable compositions contain 20 to 70 weight percent epoxy resin, 3 to 20 weight percent curing agent, 4 to 15 weight percent reactive liquid modifier, 5 to 40 weight percent toughening agent, and 0.5 to 20 weight percent oil displacing agent. Still other exemplary curable compositions contain 30 to 60 weight percent epoxy resin, 5 to 20 weight percent curing agent, 4 to 10 weight percent reactive liquid modifier, 5 to 30 weight percent toughening agent, and 1 to 10 weight percent oil displacing agent. The amounts are based on the total weight of the curable composition.

Other optional components such as fillers can be added to the curable compositions. The fillers can be added to the first part of the curable composition, to the second part of the curable composition, or to both the first part and the second part of the curable composition. Fillers are often added to promote adhesion, to improve corrosion resistance, to control the rheological properties of the composition, to reduce shrinkage during curing, to accelerate curing, to absorb contaminants, to improve heat resistance, or for a combination thereof. The fillers can be inorganic material, organic materials, or composite materials containing both inorganic and organic materials. The fillers can have any suitable size and shape. Some fillers are in the form of particles with spherical, elliptical, or platelet shapes. Other fillers are in the form of fibers.

Some fillers are inorganic fibers such as fiber glass (e.g., glass wool and glass filament), mineral wool (e.g., rock wool and slag wool), and refractory ceramic fibers. Some exemplary inorganic fibers include a mixture of $SiO_2$, $Al_2O_3$, or a combination thereof. The inorganic fibers can further include CaO, MgO, $Na_2O$, $K_2O$, $Fe_2O_3$, $TiO_2$, other oxides, or mixtures thereof. Exemplary inorganic fibers are commercially available under the trade designation COATFORCE (e.g., COATFORCE CF50 and COATFORCE CF10) from Lapinus Fibres BV in Roermond, The Netherlands. Other exemplary inorganic fibers can be prepared from wollastonite (i.e., calcium silicate).

Other fillers are organic fibers such as aramid fibers and polyolefin fibers such as polyethylene fibers. These organic fibers can be untreated or treated to change their hydrophobic or hydrophilic character. For example, some organic fibers are specially treated to make them hydrophobic or to increase their hydrophobicity. The fibers can be fibrillated. Exemplary polyolefin fibers include high-density polyethylene fibers such as those available under the trade designation SYLOTHIX (e.g., SYLOTHIX 52 and SYLOTHIX 53) from EP Minerals in Reno, Nev., those available under the trade designation ABROTHIX (e.g., ARBOTHIX PE100) from EP Minerals, those available under the trade designation SHORT STUFF (e.g., SHORT STUFF ESS2F and SHORT STUFF ESS5F) from MiniFIBERS, Inc. in Johnson City, Tenn., and those available under the trade designation INHANCE (e.g., INHANCE PEF) from Inhance/Fluoro-Seal, Limited in Houston, Tex. Exemplary aramid fibers are commercially available under the trade designation INHANCE (e.g., INHANCE KF) from Inhance/Fluoro-Seal, Ltd. in Houston, Tex.

Other suitable fillers include silica-gels, calcium silicates, calcium nitrate, calcium phosphates, calcium molybdates, calcium carbonate, calcium hydroxide, fumed silica, clays such as bentonite, organo-clays, aluminium trihydrates, magnesium dihydrates, glass microspheres, hollow glass microspheres, polymeric microspheres, and hollow polymeric microspheres. The fillers can also be a pigment such as ferric oxide, brick dust, carbon black, titanium oxide and the like. Any of these fillers can be surface modified to make them more compatible with the curable or cured composition.

Exemplary fillers include a mixture of synthetic amorphous silica and calcium hydroxide that is commercially available from W. R. Grace in Columbia, Md. under the trade designation SHIELDEX (e.g., SHIELDEX AC5), a fumed silica treated with polydimethylsiloxane to prepare a hydrophobic surface that is available from Cabot GmbH in Hanau, Germany under the trade designation CAB-O-SIL (e.g., CAB-O-SIL TS 720), a hydrophobic fumed silica available from Degussa in Dusseldorf, Germany under the trade designation AEROSIL (e.g., AEROSIL VP-R-2935), glass beads class IV (250 to 300 micrometers) from CVP S.A. in France, and epoxysilane-functionalized (2 wt %) aluminium trihydrate available under the trade designation APYRAL 24 ESF from Nabaltec GmbH in Schwandorf, Germany.

In some embodiments, fillers with oleophilic surfaces are included in the curable compositions. Without wishing to be bound by theory, it is believed these fillers may absorb at least some of the hydrocarbon-containing material at the surface of a substrate thus enhancing the bond to the substrate.

The curable composition can contain any suitable amount of the filler. In many embodiments, the curable composition contains 0.01 to 50 weight percent filler based on a total weight of the curable composition. For example, the amount can be in the range of 0.5 to 50 weight percent, in the range of 1 to 40 weight percent, in the range of 1 to 30 weight percent, in the range of 1 to 20 weight percent, in the range of 1 to 10 weight percent, in the range of 5 to 30 weight percent, or in the range of 5 to 20 weight percent.

The curable composition can include any number of other optional components. For example, an optional adhesion promoter can be added. Exemplary adhesion promoters include, but are not limited to, various silane compounds. Some silane compounds that are suitable for adhesion promoters have amino groups or glycidyl groups that can react with one or more components in the curable composition. Other exemplary adhesive promoters include various chelating agents such as those described in U.S. Pat. No. 6,632,872 (Pellerite et al.) and various chelate-modified epoxy resins such as those available from Adeka Corporation in Tokyo, Japan under the trade designation EP-49-10N and EP-49-20.

Solvents can be included in curable composition. The solvents are typically selected to be miscible with the curable composition. Solvents can be added to lower the viscosity of either the first part or the second part of the curable composition or can be added with one of the various components included in the curable composition. The amount of solvent is typically minimized and is often less than 10 weight percent based on a total weight of the curable composition. The solvent is often less than 8 weight percent, less than 6 weight percent, less than 4 weight percent, less than 2 weight percent, less than 1 weight percent, or less than 0.5 weight percent based on the total weight of the curable composition. Suitable organic solvents include those that are soluble in the curable composition and that can be removed during or after curing to form the cured composition. Exemplary organic solvents include, but are not limited to, toluene, acetone, various alcohols, and xylene.

The curable composition typically is in the form of a first part and a second part. The first part typically includes the epoxy resins, the reactive liquid modifier, plus other components that do not react with either the epoxy resin or the reactive liquid modifier. The second part typically includes the curing agent plus any other components that do not typically react with the curing agent. The toughening agent and the oil displacing agent can each be added independently to either the first part or the second part. The components in each part are typically selected to minimize reactivity within each part.

Alternatively, the curable composition can include additional parts such as a third part that can contain additional components or that can further separate the components of the curable composition. For example, the epoxy resin can be in a first part, the curing agent can be in a second part, and the reactive liquid modifier can be in a third part. The toughening agent and the oil displacing agent can each independently be in any of the first, second, or third parts.

The various parts of the curable composition are mixed together to form the cured composition. These parts are typically mixed together immediately prior to use of the curable composition. The amount of each part included in the mixture can be selected to provide the desired molar ratio of oxirane groups to amine hydrogen atoms and the desired molar ratio of reactive liquid modifier to amine hydrogen atoms.

The curable composition can be cured at room temperature, can be cured at room temperature and then at an elevated temperature (e.g., greater than 100° C., greater than 120° C., or greater than 150° C.), or can be cured at an elevated temperature. In some embodiments, the adhesive can be cured at room temperature for at least 3 hours, at least 6 hours, at least 12 hours, at least 18 hours, at least 24 hours, at least 48 hours, or at least 72 hours. In other embodiments, the composition can be cured at room temperature for any suitable length of time and then further cured at an elevated temperature such as, for example, 180° C. for a time up to 10 minutes, up to 20 minutes, up to 30 minutes, up to 60 minutes, up to 120 minutes, or even longer than 120 minutes.

The compositions may reach a desirable cohesive strength after short heat curing periods. Since the cohesive strength can often increases upon further curing under the same or different conditions, this kind of curing is referred to herein as partial curing. In principle, partial curing can be carried out using any kind of heating. In some embodiments, induction curing (e.g., spot induction curing or ring induction curing) may be used for partial curing. Induction curing is a non-contact method of heating using electric power to generate heat in conducting materials by placing an inductor coil through which an alternating current is passed in proximity to the cured composition. The alternating current in the work coil sets up an electromagnetic field that creates a circulating current in the work piece. This circulating current in the work piece flows against the resistivity of the material and generates heat. Induction curing equipment can be commercially obtained, for example, EWS from IFF-GmbH in Ismaning, Germany. The induction curing can occur, for example, at temperatures in the range of 80° C. to 180° C. with exposure times up to 120 seconds, up to 90 seconds, up to 60 seconds, up to 45 seconds, or up to 30 seconds. In yet a further embodiment, the compositions may undergo an induction cure, followed by further curing at room temperature, an elevated temperature, or both.

The cured adhesive compositions often form a robust bond with one or more substrates. A bond is typically considered to be robust if the bond breaks apart cohesively at high shear values when tested in an overlap shear test and if high T-peel strength values are obtained when tested in a T-peel test. The bonds may break in three different modes: (1) the adhesive splits apart, leaving portions of the adhesive adhered to both metal surfaces in a cohesive failure mode; (2) the adhesive pulls away from either metal surface in an adhesive failure mode; or (3) a combination of adhesive and cohesive failure (i.e., mixed mode failure).

The cured adhesive composition can typically adhere to clean metal surfaces and to metal surfaces contaminated with hydrocarbon-containing materials such as various oils and lubricants. The cured adhesive composition often has a cohesive strength, as measured by overlap shear strength, of at least 2500 psi (17.2 MPa). For example, overlap shear strength can be at least 3000 psi (20.7 MPa), at least 3200 psi (22.1 MPa), or at least 3500 psi (24.1 MPa).

The cured adhesive compositions may be used to supplement or completely eliminate a weld or mechanical fastener by applying the curable adhesive composition between two parts (i.e., between two surfaces of two substrates) to be joined and curing the adhesive to form a bonded joint. Suitable substrates onto which the adhesive of the present invention may be applied include metals (e.g., steel, iron, copper, aluminum, or alloys thereof), carbon fiber, glass fiber, glass, epoxy fiber composites, wood, and mixtures thereof. In some embodiments, at least one of the substrates is a metal. In other embodiments, both substrates are metal.

The surface of the substrates may be cleaned prior to application of the curable adhesive or coating composition. However, the compositions are also useful in applications when applied to substrates having hydrocarbon-containing material on the surface. In particular, the curable compositions may be applied to steel surfaces contaminated with various oils and lubricants such as, for example, mill oil, cutting fluid, and draw oil.

In areas of adhesive bonding, the curable adhesive composition can be applied as liquid, paste, spray, or solid that can be liquefied upon heating. The application can be as a continuous bead or as dots, stripes, diagonals or any other geometrical form that will result in the formation of a useful bond. In some embodiments, the curable adhesive composition is in a liquid or paste form.

The cured adhesive composition can be augmented by welding or mechanical fastening. The welding can occur as spot welds, as continuous seam welds, or as any other welding technology that can cooperate with the adhesive composition to form a mechanically sound joint.

The cured adhesive compositions may be used as structural adhesives. In particular, they may be used as structural adhesives in vehicle assembly, such as the assembly of watercraft vehicles, aircraft vehicles, or motorcraft vehicles such as cars and motor bikes. In particular, the adhesive compositions may be used as hem-flange adhesives or in body frame construction. The adhesive compositions may also be used as structural adhesives in architectural applications or as structural adhesives in various household and industrial appliances.

The current invention is also directed to a method for coating the surface of a substrate, in particular the interior surface of a pipe or a pipeline comprising the steps of:
providing a curable composition according to the current invention,
covering the surface of the substrate at least partly with the curable composition,
allowing the curable composition to cure.

Another embodiment of this invention is directed to a method for bonding at least two substrates together, comprising the steps of:
providing a curable composition according to the current invention,
covering the surface of one or both substrates at least partly with the curable composition,
bringing the substrates into contact in the surface section covered with the curable composition and
allowing the curable composition to cure.

For the coating-method or bonding-method of this invention the curable composition may be applied to the substrate surface by spraying, brushing, painting, dip-coating, flow coating, knife coating, roller coating, bar coating.

If the curable composition is used as a two-part composition, the step of providing a curable composition includes the step of mixing first and second parts of the curable composition in an appropriate ratio.

Objects and advantages of this invention are further illustrated by the following examples, but the particular materials and amounts thereof recited in these examples, as well as other conditions and details, should not be construed to unduly limit this invention. These examples are merely for illustrated purposes only and are not meant to be limiting the scope of the appending claims.

The following materials have been used:

AEP: 1-(2-aminoethyl)piperazine
APM: (4-(3-aminopropyl)morpholine
BHT: 2,6-di-t.butyl-4-methylphenol, available from Aldrich
DBTDL: dibutyltindilaurate
DBU: 1,8-diazabicylo[5.4.0]undec-7-ene, available from Aldrich
EP2306 SF: epoxy base, available from 3M Northallerton
Jeffamine: polyether amines, available from Huntsman
MA: methylacrylate
PEI: polyethylenimine
PAI: polyalkylenimine
TEPA: tetraethylene pentamine, available from Huntsman or Dow Chemical Company

TEST METHOD DESCRIPTIONS

Viscosity Measurement:

The viscosity was measured using a Brookfield viscometer synchro-electric model LVF. The spindle and rotation speed were selected as indicated in the attached table. The test solution was preconditioned at 23° C. in a water bath. The spindle was attached to the viscosimeter and immersed into the solution until the surface of the solution reached the mark on the spindle. After setting the rotation speed at a chosen level, the measurement was started. The viscosity value was read on the scale after 1 minute. The actual viscosity value was calculated by multiplying the value read on the viscosity scale with the calibration factor on the equipment and the correction factor on the finder card correlating with the used spindle, speed and viscosimeter model.

Shore D:

A test specimen was prepared by mixing 10 g EP2306 SF epoxy resin (available from 3M) with 2.7 g epoxy curing agent using a spatula for one minute and pouring this mixture into a round plastic lid with a diameter of 45 mm and a height of 15 mm. The test specimen was kept at room temperature for about three hours, followed by heating for sixteen hours at 50° C. in a ventilated oven. The test specimen was cooled to room temperature and then manually tested for shore D hardness using a shore D durometer (commercially available from Hildebrand DIN 50505 ASTM D 2240 Iso 868). For shore D value the average was taken of six measurements on the same test specimen.

Gloss:

A test specimen was prepared by mixing 5 g EP2306 SF epoxy resin (available from 3M) with 1.35 g epoxy curing agent using a spatula for one minute and coating this mixture on 5 cm×10 cm piece of 80 µm PES film using a 500µ bar coater (K Bar available from RK Print Coat Instruments Ltd.). The test specimen was kept at room temperature for about three hours, followed by heating for sixteen hours at 50° C. in a ventilated oven. After cooling to room temperature the gloss was measured with a "Super 3 Gloss" meter (obtained from Braive Instruments), using a 60° illumination angle. For gloss value the average was taken of three measurements on the same test specimen.

Flexibility:

The coating flexibility was measured using an Elcometer 1510 Conical Mandrel Bend Tester according to ASTM D522-93a (Reapproved 2008), "Standard Test Methods for Mandrel Bend Test of Attached Organic Coatings". This test is further referred to as "Conical Mandrel Bend Test".

The test coating compositions were prepared as explained in the specific examples and coated on cold-rolled steel strips of 100 mm (4 in.) in width, 150 mm (6 in.) in length and 0.8 mm thickness. The coating had a uniform thickness of 100 µm (4.0 mil). The coating was cured for 16 hrs at 50° C., then conditioned for 24 h at 23+/−2° C. (73.5+/−3.5° F.) and 50+/−5% relative humidity. The test was carried out in the same environment with a conical mandrel test apparatus ref. 801 from Sheen with a metal cone of smooth steel, 8 in. (200 mm) in length, with a diameter of 3 mm (⅛ in.) at one end and a diameter of 38 mm (1-12 in.) at the other end, as described in detail in ASTM D522.

In the following, several examples of polyether-amido-amine compounds according to this invention are presented:

EXAMPLE CA-1

Jeffamine D400/MA/TEPA mole ratio 1/1/1

Amine (NH) Eq. W.: ~82

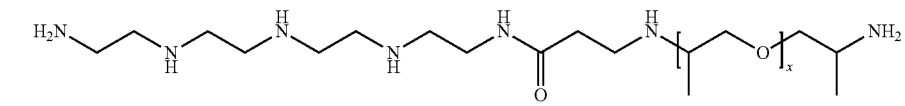

with x: 5-6
Basic recipe: 155105-21-1
Step 1

A 500 ml polymerization bottle was charged with 170.2 g Jeffamine D-400 (0.43 mol), 36.6 g methyl acrylate (0.43 mol), 62 mg 2,6-di-t.butyl-4-methylphenol (BHT; 300 ppm) and 0.292 g 1,8-diazabicylo[5.4.0]undec-7-ene (DBU) successively. The polymerization bottle was sealed and run 16 hours at 85° C. in a preheated launder-o-meter. NMR-spectroscopy confirmed completion of the aza-Michael-addition reaction step.

Step 2

For the amidation step 85.1 g tetraethylene pentamine (TEPA; 0.43 mole) were added to the reaction mixture. The bottle was purged with nitrogen, sealed and run at 80° C. in a pre-heated launder-o-meter for 48 hours.

NMR indicated completion of the reaction (99% methyl-ester conversion). The methanol produced during the reaction was distilled off using a Mai rotary evaporator. A clear, yellowish semi-viscous liquid was obtained.

The product can be further diluted with AMP or another reactive diluent to further reduce the viscosity:

CA-1 30% AMP: formulation with 30% AMP
CA-1 50% AMP: formulation with 50% AMP
Evaluation of Different Reaction Temperatures (Step 2):
Step 1: 155105-101

A 500 ml polymerization bottle was charged with 320 g Jeffamine D-400 (0.80 mol), 68.8 g methyl acrylate (0.80 mol), 0.117 g 2,6-di-t.butyl-4-methylphenol (BHT; 300 ppm) and 0.523 g 1,8-diazabicylo[5.4.0]undec-7-ene (DBU) successively. The polymerization bottle was sealed and run 6 hours at 80° C. in a pre-heated launder-o-meter. NMR-spectroscopy confirmed completion of the aza-Michael-addition reaction.

Step 2: 155105-103
Reaction at 80° C.

243.4 G product from step 1 (0.50 mole) and 100 g tetraethylene pentamine (TEPA; 0.50 mole) were charged into a 500 ml polymerization bottle. The bottle was purged with nitrogen, sealed and run at 80° C. in a pre-heated launder-o-meter.

NMR follow-up showed the reaction was completed after about 70 hours (98% methylester conversion). Then the methanol produced during the reaction was distilled off using a Büchi rotary evaporator. A clear, yellow semi-viscous liquid was obtained.

C13 NMR indicated that the reaction product consisted for 100% out of secondary amides (reaction of primary amine with methylester).
Reaction at 105° C.

243.4 G product from step 1 (0.50 mole) and 100 g tetraethylene pentamine (TEPA; 0.50 mole) were charged into a 500 ml 3-neck flask, equipped with a heating mantle, mechanical stirrer, thermometer and Dean-Stark condenser. The reaction mixture was heated to 105° C. under a nitrogen flow. The produced methanol was collected in the Dean-Stark condenser.

NMR follow-up of the reaction showed that a reaction time of about 18 hours at 105° C. was needed to obtain essentially quantitative conversion (99% methylester conversion).

The remaining methanol produced during the reaction was distilled off using a Mai rotary evaporator. A clear, yellow semi-viscous liquid was obtained.

C13 NMR indicated that the reaction product consisted for 92% out of secondary amides (reaction of primary amine with methylester) and 8% tertiary amides (reaction of secondary amine with methylester).

Reaction at 130° C.

243.4 G product from step 1 (0.50 mole) and 100 g tetraethylene pentamine (TEPA; 0.50 mole) were charged into a 500 ml 3-neck flask, equipped with a heating mantle, mechanical stirrer, thermometer and Dean-Stark condenser. The reaction mixture was heated to 130° C. under a nitrogen flow. The produced methanol was collected in the Dean-Stark condenser.

NMR follow-up of the reaction showed that a reaction time of 6 hours at 130° C. was needed to obtain essentially quantitative conversion (98% methylester conversion). The remaining methanol produced during the reaction was distilled off using a Buchi rotary evaporator. A clear, yellow semi-viscous liquid was obtained.

C13 NMR indicated that the reaction product consisted for 82% out of secondary amides (reaction of primary amine with methylester) and 18% tertiary amides (reaction of secondary amine with methylester).

EXAMPLE CA-2

155105-113-3: Jeffamine D400/MA/TEPA mole ratio 1/1.2/1.2 Amine (NH) Eq. W.: ~80

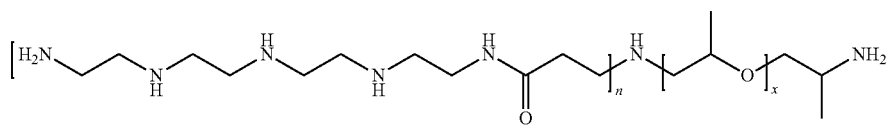

with n: 1.2
Step 1: 155105-109

A 500 ml polymerization bottle was charged with 307.7 g Jeffamine D-400 (0.77 mol), 79.4 g methyl acrylate (0.92 mol), 0.116 g 2,6-di-t.butyl-4-methylphenol (BHT; 300 ppm) and 0.542 g 1,8-diazabicylo[5.4.0]undec-7-ene (DBU) successively. The polymerization bottle was sealed and run 6 hours at 80° C. in a preheated launder-o-meter. NMR-spectroscopy confirmed completion of the aza-Michael-addition reaction.

Step 2: 155105-113-3

200 G product from step 1 and 120 g tetraethylene pentamine (TEPA; 0.60 mole) were charged into a 500 ml 3-neck flask, equipped with a heating mantle, mechanical stirrer, thermometer and Dean-Stark condenser. The reaction mixture was heated to 130° C. under a nitrogen flow. The produced methanol was collected in the Dean-Stark condenser.

NMR spectroscopy showed that the reaction was completed after 6 hours (98.5% methylester conversion). The remaining methanol produced during the reaction was distilled off using a Büchi rotary evaporator. A clear, yellow semi-viscous liquid was obtained.

EXAMPLE CA-3

155105-90: Jeffamine D400/MA/TEPA mole ratio 1/2/2

Amine (NH) Eq. W.: ~76

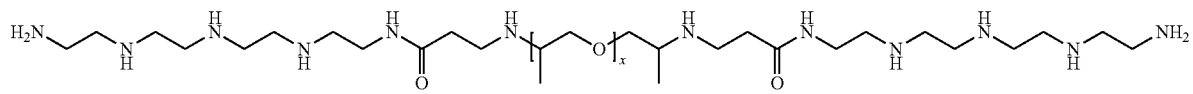

Step 1:

A 1 L 3-neck flask, equipped with a heating mantle, mechanical stirrer, thermometer, Dean-Stark condenser and calcium chloride tube was charged with 347.8 g Jeffamine D-400 (0.87 mol), 149.6 g methyl acrylate (1.74 mol), 0.149 g 2,6-di-t.butyl-4-methylphenol (BHT; 300 ppm) and 0.845 g 1,8-diazabicylo[5.4.0]undec-7-ene (DBU) successively. The ingredients were reacted for 8 hours at 80° C.

Step 2:

After cooling 347.8 g tetraethylene pentamine (TEPA; 1.74 mole) were charged and the reaction mixture was heated to 135° C. under a nitrogen flow. The produced methanol was collected in the Dean-Stark condenser. After 6 hours the reaction was completed, as indicated by NMR spectroscopy (99% methylester conversion). The remaining methanol produced during the reaction was distilled off using a Büchi rotary evaporator. A clear, yellowish viscous liquid was obtained.

EXAMPLE CA-4

155105-69: Jeffamine D400/MA/TEPA mole ratio 2/2/1

Amine (NH) Eq. W.: ~123

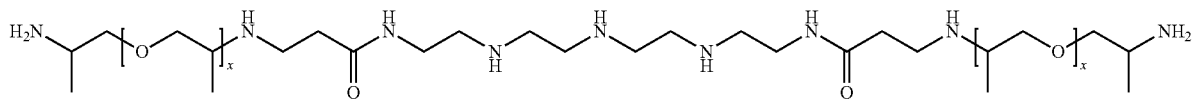

Step 1:

A 1 L 3-neck flask, equipped with a heating mantle, mechanical stirrer, thermometer, Dean-Stark condenser and calciumchloride tube was charged with 571.4 g Jeffamine D-400 (1.43 mol), 122.9 g methyl acrylate (1.43 mol), 0.208 g 2,6-di-t.butyl-4-methylphenol (BHT; 300 ppm) and 0.837 g 1,8-diazabicylo[5.4.0]undec-7-ene (DBU) successively. The ingredients were reacted for 6 hours at 80° C.

Step 2:

After cooling 142.9 g tetraethylene pentamine (TEPA; 0.714 mole) were charged and the reaction mixture was heated to 135° C. under a nitrogen flow. The produced methanol was collected in the Dean-Stark condenser. After 12 hours the reaction was completed, as indicated by NMR spectroscopy (99% methylester conversion). The remaining methanol produced during the reaction was distilled off using a Büchi rotary evaporator. A clear, yellowish viscous liquid was obtained.

TEST RESULTS

The viscosity of the polyether-amido-amine compounds CA-1 to CA-4 are given in the following table 2:

TABLE 2

| Curing agent | Nbk no | Ratio Jeff. D400/MA/TEPA | % AMP | Viscosity (mPa.s) | Spindle | rpm |
|---|---|---|---|---|---|---|
| CA-1 | 155105-101 (Rx @ 130° C.) | 1/1/1 | None | 597 | 2 | 12 |
| CA-1 | 155105-101 (Rx @ 130° C.) | 1/1/1 | 25% | 113 | 1 | 12 |
| CA-2 | 155105-113-3 | 1/1.2/1.2 | None | 1277 | 2 | 12 |
| CA-3 | 155105-90 | 1/2/2 | None | 3441 | 2 | 6 |
| CA-3 | 155105-90 | 1/2/2 | 25% | 319 | 2 | 6 |
| CA-4 | 155105-69 | 2/2/1 | None | 1568 | 2 | 12 |
| CA-4 | 155105-69 | 2/2/1 | 25% | 167 | 2 | 12 |

These data show that most curing agents of the invention have a low to fairly low viscosity, making them particularly useful for ambient temperature curing of low VOC epoxy coatings and resins. Optionally reactive diluents such as aminopropyl morpholine (AMP) or piperazine can be added to further reduce viscosity.

Use for "Zero VOC Content Flow Efficiency Coatings" for Gas Pipelines:

Procedure:

Zero VOC content flow efficiency gas pipeline coating formulations were prepared by mixing 100 g epoxy resin EP2306 SF (available from 3M) with 27 g curing agent. The resin mix was coated on a PES film using a 500μ coating bar. The film was cured at 50° C. in a forced air oven for 16 hours.

Results:

Curing Agent CA-1 with nbk No. 155105-21-1 was Used for Testing

| Test # | Curing agent type | Co-curing agent | Coating properties after curing 16 hrs @ 50° C. | | |
|---|---|---|---|---|---|
| | | | 60° Gloss | Shore D | Flexibility (conical mandrel test) |
| #1 | 82.5% Ancamide 2443 | 17.5% Ancamine 2422 | 97 | 76 | passes bend at 13 mm Ø |
| #2 | 70% CA-1 + 30% AMP | none | 89 | 85 | passes bend at 13 mm Ø |
| #3 | 50% CA-1 + 50% AMP | none | 97 | 82 | passes bend at 13 mm Ø |

Curing agent CA-2 with nbk no. 155105-113-3 was used for testing. For #5 CA-2 was combined with 15% reactive diluent AMP. For #6 and #7 CA-2 was combined with reactive diluent AMP and Jeffamine co-curing agents.

| Test # | Curing agent type | Co-curing agent | Coating properties after curing 16 hrs @ 50° C. | |
|---|---|---|---|---|
| | | | Shore D | 60° gloss |
| #4 | 82.5% Ancamide 2443 | 17.5% Ancamine 2422 | 82 | 95 |
| #5 | 85% CA-2 + 15% AMP | none | 82 | 87 |
| #6 | 65% CA-2 + 15% AMP | 20% Jeffamine D400 | 79 | 91 |
| #7 | 65% CA-2 + 15% AMP | 20% Jeffamine D230 | 72 | 97 |

Above results indicate that the novel polyether-amidoamine compound curing agents react with epoxy compounds to yield glossy coatings with good hardness and excellent flexibility, comparable to the state-of-the-art coatings, obtained with the Ancamide 2443/Ancamine 2422 curing agents.

The invention claimed is:

1. A polyether-amido-amine compound, obtainable by a two-step reaction of a polyetheramine with an alkyl acrylate and a polyalkyleneimine, wherein the polyetheramine and the polyalkyleneimine have at least one primary or secondary amine group, in which the first step comprises the reaction of the polyetheramine with the alkyl acrylate and the second step comprises the reaction of the polyalkyleneimine with the product of the first step, characterized in that the first step is conducted via an aza-Michael addition and/or the second step is conducted as a condensation reaction.

2. The compound according to claim 1, characterized in that the polyetheramine has the general formula Ia or Ib

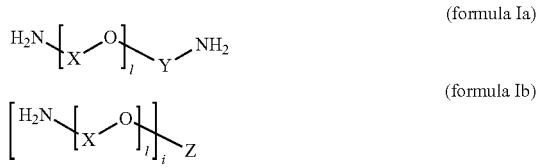

with X, Y being independently a substituted or unsubstituted, branched or unbranched bivalent group chosen from alkylene or arylene, Z being a substituted or unsubstituted, branched or unbranched i-valent alkyl or aryl group, i being an integer from 1 to 5, and 1 being an integer from 2 to 200.

3. The compound according to claim 1, characterized in that the polyetheramine comprises at least one end group selected from the group consisting of iso-propylamine, iso-butylamine and tert-butylamine.

4. The compound according to claim 1, characterized in that the alkyl group of the alkyl acrylate has 1 to 10 carbon atoms.

5. The compound according to claim 1, characterized in that the polyalkyleneimine has the general formula II

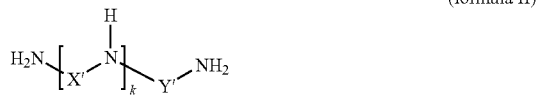

with X', Y' being independently a branched or unbranched bivalent group chosen from alkylene or arylene and k being an integer from 2 to 100.

6. The compound according to claim 1, characterized in that the mole ratio of polyetheramine:alkyl acrylate ranges from 10:1 to 1:4.

7. A method for synthesizing a polyether-amido-amine compound by a two-step reaction of a polyetheramine with an alkyl acrylate and a polyalkyleneimine, wherein the polyetheramine and the polyalkyleneimine have at least one primary or secondary amine group, in which the first step comprises the reaction of the polyetheramine with the alkyl acrylate and the second step comprises the reaction of the polyalkyleneimine with the product of the first step, characterized in that the first step is conducted via an aza-Michael addition and/or the second step is conducted as a condensation reaction.

8. A curable composition comprising a curable compound and at least one polyether-amido-amine compound according to claim 1 as a curing agent.

9. The curable composition according to claim 8, characterized in that the composition comprises a first part and a second part to be mixed together before use, wherein the curable compound is in the first part and the curing agent is in the second part.

10. The curable composition according to claim 8, characterized in that the curable composition comprises at least one substance selected from a group consisting of reactive modifiers, reactive diluents, oil-displacing agents, corrosion inhibitors, anti-oxidants, fillers, plasticizers, stabilizers, molecular sieves, further curing agents and accelerators.

11. A cured composition comprising the reaction product of a curable composition according to claim 8.

12. A method for coating the surface of a substrate comprising the steps of:
providing a curable composition according to claim 8,
covering the surface of the substrate at least partly with the curable composition,
allowing the curable composition to cure.

13. A method for bonding at least two substrates together, comprising the steps of:
providing a curable composition according to claim 8,
covering the surface of one or both substrates at least partly with the curable composition,
bringing the substrates into contact in the surface section covered with the curable composition and
allowing the curable composition to cure.

14. The method according to claim 12, characterized in that the curable composition is applied to the substrate surface by spraying, brushing, painting, dip-coating, flow coating, knife coating, roller coating, or bar coating.

* * * * *

UNITED STATES PATENT AND TRADEMARK OFFICE
CERTIFICATE OF CORRECTION

PATENT NO. : 9,228,055 B2  
APPLICATION NO. : 14/002457  
DATED : January 5, 2016  
INVENTOR(S) : Frans Audenaert Page 1 of 1

It is certified that error appears in the above-identified patent and that said Letters Patent is hereby corrected as shown below:

Title page,
Item [56], References Cited, OTHER PUBLICATIONS, delete "Systhesis" and insert -- Synthesis -- in place thereof.
Item [56], References Cited, OTHER PUBLICATIONS, delete "Polyanione" and insert -- Polyanion -- in place thereof.
Item [57], Abstract, delete "polyalkyle-neimine" and insert -- polyalkyleneimine -- in place thereof.

In the Specification,
Column 11,
Line 12, delete "cylcohexyl" and insert -- cyclohexyl -- in place thereof.
Line 41, delete "Allentonwn" and insert -- Allentown -- in place thereof.

Column 20,
Line 18, delete "dialkly" and insert -- dialkyl -- in place thereof.

Column 28,
Line 64, delete "Mai" and insert -- Büchi -- in place thereof.

Column 29,
Line 49, delete "Mai" and insert -- Büchi -- in place thereof.

Signed and Sealed this
Twenty-third Day of August, 2016

Michelle K. Lee
*Director of the United States Patent and Trademark Office*